(12) United States Patent
Wang et al.

(10) Patent No.: US 10,432,927 B2
(45) Date of Patent: Oct. 1, 2019

(54) 3D TEST CHART, ADJUSTING ARRANGEMENT, FORMING METHOD AND ADJUSTING METHOD THEREOF

(71) Applicant: NingBo Sunny Opotech Co., Ltd., Ningbo, Zhejiang (CN)

(72) Inventors: Mingzhu Wang, Ningbo (CN); Baozhong Zhang, Ningbo (CN); Chunmei Liu, Ningbo (CN)

(73) Assignee: Ningbo Sunny Opotech Co., Ltd., Ningbo, Zhejiang (CN)

( * ) Notice: Subject to any disclaimer, the term of this patent is extended or adjusted under 35 U.S.C. 154(b) by 596 days.

(21) Appl. No.: 14/872,014

(22) Filed: Sep. 30, 2015

(65) Prior Publication Data

US 2016/0094841 A1 Mar. 31, 2016

(30) Foreign Application Priority Data

| Sep. 30, 2014 | (CN) | 2014 1 0524278 |
| Dec. 16, 2014 | (CN) | 2014 1 0781236 |
| Dec. 16, 2014 | (CN) | 2014 1 0781368 |
| Dec. 16, 2014 | (CN) | 2014 1 0783740 |

(51) Int. Cl.
*H04N 17/00* (2006.01)
*H04N 13/00* (2018.01)
*H04N 5/225* (2006.01)

(52) U.S. Cl.
CPC .................. *H04N 17/002* (2013.01)

(58) Field of Classification Search
None
See application file for complete search history.

(56) References Cited

U.S. PATENT DOCUMENTS

| 2006/0023215 A1* | 2/2006 | Berner | G01J 3/10 356/402 |
| 2010/0020180 A1* | 1/2010 | Hill | H04N 5/2253 348/188 |
| 2015/0076041 A1* | 3/2015 | Irie | G06K 9/68 209/546 |
| 2015/0138372 A1* | 5/2015 | Apel | G02B 27/62 348/188 |

FOREIGN PATENT DOCUMENTS

CN 1862305 * 11/2006

* cited by examiner

*Primary Examiner* — Edemio Navas, Jr.
(74) *Attorney, Agent, or Firm* — Raymond Y. Chan; David and Raymond Patent Firm

(57) ABSTRACT

A 3D test chart, an adjusting arrangement, a forming method, and an adjusting method thereof are disclosed. The 3D test chart provides a plurality of test patterns arranged at different depths. When testing a photographic arrangement, the photographic arrangement is only required to move for one time or even does not need to be moved, so as to obtain an image containing information of different depths, so that the testing and adjusting process of the photographic arrangement can be easily achieved.

8 Claims, 40 Drawing Sheets

Capture information of scenes of different depths of a 3D test chart, determine a relative position of a photographic module 11 and an image sensor 12 of the photographic arrangement 10, and obtain related data corresponding to the relative position Based on the related data, accomplish an adjusting process of the photographic module 11 and the image sensor 12

FIG.40

3D TEST CHART, ADJUSTING ARRANGEMENT, FORMING METHOD AND ADJUSTING METHOD THEREOF

NOTICE OF COPYRIGHT

A portion of the disclosure of this patent document contains material which is subject to copyright protection. The copyright owner has no objection to any reproduction by anyone of the patent disclosure, as it appears in the United States Patent and Trademark Office patent files or records, but otherwise reserves all copyright rights whatsoever.

BACKGROUND OF THE PRESENT INVENTION

Field of Invention

The present invention relates to the field of optical system, and more particularly to a 3D test chart, adjusting arrangement, forming method and adjusting method thereof, wherein the 3D test chart is arranged for providing a plurality of test patterns of different depths, so that a photographic arrangement to be tested, which is only required to be moved for one time or even do not need to be moved, is able to obtain images of various different depths, so that a user is able to quickly test and adjust the photographic arrangement.

Description of Related Arts

Along with the fast and intelligent development of science and technology, such as the development in the field of electronic engineering and communication engineering, the photographic arrangement which is used for obtaining images and videos and serving as the medium for expanding human's visions, has become a core component which is widely used in various electronic devices. For instance, an electronic product, such as a smart phone, a tablet computer, a notebook computer, a personal computer terminal device, a PDA (personal digital assistant), a transportation tool, a medical device, and a monitoring device, has been provided with at least one camera device by implanting the camera device into the ecosystem to form a camera system for obtain image or video information of the environment. It can be made a conclusion that the fast development of these electronic products has caused the thriving of the field of the camera devices.

In order to enhance the user experience and expand the application depth of these products, more and more photographic arrangements are developed to be miniaturized, microminiaturized, as well as are developed with higher imaging quality, thus the volume of the camera device has been limited to be smaller and smaller with respect to this trend. Therefore, how to increase the imaging quality and guarantee the yield rate of the camera devices while minimize the volume as small as possible is the developing direction and breaking point of this technical field.

A photographic arrangement generally comprises a photographic module, an image sensor and other components such as a holder. When assembling the photographic module with the image sensor, the tilt of the image plane of the lens of the photographic module, the tilt tolerance of other components of the photographic module, and the tilt resulting from the packaging process will cause the tilt and shift between the photographic module and the image sensor, and finally adversely influence the imaging quality of the photographic system. Therefore, it is an indispensable procedure to adjust the positions of the image plane of the photographic module and the light receiving plane of the image sensor to solve the problem of the tilt and shift theretween before fixing up the photographic module with the image sensor of the photographic arrangement.

The above mentioned procedure includes a testing process and an adjusting process. A conventional testing process of an optical system, which can be carried out by an orthographic projection method (employing a transmissive or reflective test chart) or a back projection method (employing a transmissive test chart), generally relies on moving the photographic module or the test chart to adjust the relative position of the photographic module to be tested with respect to the test chart or the image sensor, so as to obtain the functional relationship between the imaging quality and the defocus curve, and then calculate the focus point and tilt vector of each target to obtain the relative tilt of the photographic module with respect to the test chart or the image sensor, and carry out the adjusting process based on the relative tilt thereof. However, this conventional method for testing optical systems has an adverse disadvantage that greatly influences the testing and adjusting efficiency. More specifically, it takes a lot of time for the conventional testing device to gradually move its components to obtain the functional relationship between the imaging quality and the defocus curve. Furthermore, during the testing process of the photographic arrangement, when the incline angle of the image plane of the photographic module is relatively large, in order to collect data of higher focus point of the target, the photographic module is required to be moved with a relatively large distance, but when the photographic module is moved towards the image sensor, it may clash on other components or cause the bonding glue to slip off, and thus resulting in the failure of the test and the correction. In addition, the conventional testing device is bulky in size and occupying a lot of space, so that it is relatively expensive for testing the photographic arrangement.

In addition, the conventional testing device, which is assembled according to the conventional testing and adjusting principle for the photographic arrangement, should spare a relative large space for guaranteeing the moving displacement of the photographic arrangement, so that the volume of the convention testing device is relatively large and the structure is also complicated, and it is not likely to be widely used because it takes a lot of time for carrying out the operation one the photographic arrangement with the testing device and the cost is relatively high. Therefore, providing a testing device which can significantly improve the imaging quality of the photographic arrangement, reducing the volume and cost of the testing and adjusting device, as well as facilitating the focusing of the photographic arrangement and the adjusting the tilt of the image plane, remains a problem to be solved in this industry.

SUMMARY OF THE PRESENT INVENTION

A main object of the present invention is to provide a 3D test chart, an adjusting arrangement, a forming method and an adjusting method thereof, wherein the 3D test chart is arranged for providing a plurality of test patterns of different depths, so that a photographic arrangement to be tested, which is only required to be moved for one time or even do not need to be moved, is able to obtain images of various different depths, so that a user is able to quickly test and adjust the photographic arrangement.

Another object of the present invention is to provide a 3D test chart, an adjusting arrangement, a forming method and an adjusting method thereof, wherein when the 3D test chart is used for testing the photographic arrangement, the photographic arrangement is only required to be moved at most for one time before obtaining the functional relationship between the imaging quality of the photographic arrangement and the related data and parameters, and then the relative position and the tilt between the photographic module of the photographic arrangement and the image sensor, so as to reduce operation procedures.

Another object of the present invention is to provide a 3D test chart, an adjusting arrangement, a forming method and an adjusting method thereof, wherein the 3D test chart allows the user to simultaneously analysis the focal length and the tilt of the image plane of the photographic arrangement by just shooting for one time, so as to obtain the corresponding data for facilitating the subsequent adjusting process.

Another object of the present invention is to provide a 3D test chart, an adjusting arrangement, a forming method and an adjusting method thereof, wherein the 3D test chart is able to provide a plurality of scenes of different depths, so that in compassion with the conventional testing device, the 3D test chart enables the testing device of the present invention to be designed much smaller, so that the space reserved for enabling the movement of the components of the photographic arrangement is omitted in the present invention, so as to reduce the volume of the testing device as much as possible.

Another object of the present invention is to provide a 3D test chart, an adjusting arrangement, a forming method and an adjusting method thereof, wherein the 3D test chart meets the requirement of the trend of the photographic arrangement as being relatively small and miniature, and also solves the bottleneck problem of the conventional procedure in which the photographic module and the image sensor may bump or clash on the components at a bottom side of the testing device when the relative position therebetween is being adjusted.

Another object of the present invention is to provide a 3D test chart, an adjusting arrangement, a forming method and an adjusting method thereof, wherein the 3D test chart is able to provide at least one test pattern in different planes and may provide at least one test pattern at different positions in a same plane, thus the photographic arrangement, which can be arranged in a static state, is able to capture test patterns of different depths of the 3D test chart, so as to provide data for a subsequent resolution analysis step of the photographic arrangement.

Another object of the present invention is to provide a 3D test chart, an adjusting arrangement, a forming method and an adjusting method thereof, wherein the 3D test chart can be replaced according to different requirements, and the size and the specification of the 3D test chart also can be adjusted, so that it is convenient to use.

Another object of the present invention is to provide a 3D test chart, an adjusting arrangement, a forming method and an adjusting method thereof, wherein the 3D test chart can be embodied as any test chart which can provide scenes of different depths as well as guarantee the suitable image contrast, such as a transmissive test chart, a reflective test chart, a projective test chart, and a focus zoom test chart.

Another object of the present invention is to provide a 3D test chart, an adjusting arrangement, a forming method and an adjusting method thereof, wherein the pattern of the test pattern of the 3D test chart can be any pattern as long as the pattern can be used to calculate the imaging quality of the photographic arrangement, such as a triangular shape, a circular shape, an oval shape, a pair of black and white lines, a cross shape, a star shape and the combination thereof, so as to facilitate the selection and preparation of the 3D test chart.

Another object of the present invention is to provide a 3D test chart, an adjusting arrangement, a forming method and an adjusting method thereof, wherein an excessive noise is avoided when the test patterns are used to test the photographic arrangement and analyze the resolution, so that the test result can be precise and correct.

Another object of the present invention is to provide a 3D test chart, an adjusting arrangement, a forming method and an adjusting method thereof, wherein incorporating the plurality of test patterns into the 3D test chart enables the user to obtain more data reflecting the resolution of the photographic arrangement, so as to make sure that the adjusting of the photographic arrangement can be effectively accomplished.

Another object of the present invention is to provide a 3D test chart, an adjusting arrangement, a forming method and an adjusting method thereof, wherein in a same filed view, when the plurality of layers of the test patterns is captured by the photographic module of the photographic arrangement, image planes of the photographic module of the photographic arrangement will not interfere with each other, so as to guarantee the reliability and precision of the testing result.

Another object of the present invention is to provide a 3D test chart, an adjusting arrangement, a forming method and an adjusting method thereof, wherein the 3D test chart can be embodied as a cross type 3D test chart which has test patterns of different depths, such as cross type test patterns which are not sensitive to errors, so that the contrast between the cross type test patterns and the carrier layers is always guaranteed when the cross type 3D test chart is employed to test the photographic arrangement, and thus it is easy for the photographic arrangement to obtain the information of the corresponding cross type test patterns.

Another object of the present invention is to provide a 3D test chart, an adjusting arrangement, a forming method and an adjusting method thereof, wherein more cross type test patterns can be arranged in a limited area of the cross type 3D test chart, so that when the cross type patterns are projected to the image space, more pixel points can occupy the area of the image, so as to facilitate the calculation of the testing result.

Another object of the present invention is to provide a 3D test chart, an adjusting arrangement, a forming method and an adjusting method thereof, wherein more cross type test patterns can be arranged in a limited area of the cross type 3D test chart, so that the pattern of the combination of the test patterns of the cross type 3D test chart can be significantly abounded, so that more data reflecting the resolution of the photographic arrangement can be obtained, so as to facilitate the subsequent step of the obtaining of the testing result.

Another object of the present invention is to provide a 3D test chart, an adjusting arrangement, a forming method and an adjusting method thereof, wherein the configuration of each of the cross type test patterns of the cross type 3D test chart can be adjusted according to actual requirements, so as to reduce the testing time of the photographic arrangement, and thus further reduce the cost of the use of the cross type 3D test chart.

Another object of the present invention is to provide a 3D test chart, an adjusting arrangement, a forming method and an adjusting method thereof, wherein the graph of the cross type test pattern is simple, easy to prepare, and is suitable for many testing occasions, so that the testing and manufacturing cost for the photographic arrangement is reduced.

Another object of the present invention is to provide a 3D test chart, an adjusting arrangement, a forming method and an adjusting method thereof, wherein the cross type 3D test chart allows the user to employ any method to evaluate the resolution of the photographic arrangement, such as MTF (Modulation Transfer Function) method, and calculate the focal point and tilt of the image plane of the photographic arrangement, so as to expand the application range.

Another object of the present invention is to provide a 3D test chart, an adjusting arrangement, a forming method and an adjusting method thereof, wherein in comparison with the conventional testing method, the method, which introduces the 3D test chart with scenes of different depths to test and adjust the relative position of the photographic module and the image sensor of the photographic arrangement, reduces the steps of the procedure as well as the consumption time for testing and adjusting the photographic arrangement.

Another object of the present invention is to provide a 3D test chart, an adjusting arrangement, a forming method and an adjusting method thereof, wherein by establishing a plurality of layers of test patterns, which are not overlapped with each other, along the direction of the depth in this method, it is possible for enabling the photographic arrangement to obtain images of different depths in one single step and accomplish the testing and adjusting procedure.

Another object of the present invention is to provide a 3D test chart, an adjusting arrangement, a forming method and an adjusting method thereof, wherein the method may only require at the very least shooting one time to provide one picture for obtaining the functional relationship between the imaging quality and the defocus curve of the photographic module and the image sensor, so as to simply the testing process.

Another object of the present invention is to provide a 3D test chart, an adjusting arrangement, a forming method and an adjusting method thereof, wherein in the method, the photographic arrangement is only required to be moved a few times (i.g. one to three times of moving, or even no moving step) before obtaining parameters reflecting the imaging quality of the photographic arrangement as well as other data, so that the user can adjust the relative position of the photographic arrangement and the image sensor based on the data, including adjusting the focal length and the tilt of the image plane.

Another object of the present invention is to provide a 3D test chart, an adjusting arrangement, a forming method and an adjusting method thereof, wherein the method enables simultaneously test of the focal length and the tilt of the image plane of the photographic arrangement, as well as synchronous adjustment, so that the efficiency is greatly improved.

Another object of the present invention is to provide a 3D test chart, an adjusting arrangement, a forming method and an adjusting method thereof, wherein the method can be introduced to decrease the error tolerance of the photographic arrangement, and bring down the influence of the assembling procedure acting on the imaging quality, so that the imaging performance of the photographic arrangement is greatly improved.

Another object of the present invention is to provide a 3D test chart, an adjusting arrangement, a forming method and an adjusting method thereof, wherein since the photographic arrangement is only required to be moved a few times during the testing procedure, the adjusting arrangement, which is designed based on the adjusting method of the present invention, is not required to reserve a relatively large space for enabling the movement of the components of the photographic arrangement, so that the volume and cost of the adjusting arrangement can be reduced.

Additional advantages and features of the invention will become apparent from the description which follows, and may be realized by means of the instrumentalities and combinations particular point out in the appended claims.

According to the present invention, the foregoing and other objects and advantages are attained by a 3D test chart comprising a plurality of test chart layers arranged in a direction along a depth thereof, wherein each of the test chart layers is provided with at least one test pattern, wherein in the direction along the depth, each of the test pattern of one of the test chart layers does not overlap with other the test patterns of other the test chart layers.

According to an embodiment of the present invention, in the above 3D test chart, set a as a parameter which represents a precision requirement for fitting a back focus of a photographic arrangement to be tested, set EFL as a parameter which represents a focal length, set h as a parameter which represent a position configuration of the 3D test chart, wherein $h_j$ represents a position of jth layer of the test chart layers, wherein a functional equation regarding a position configuration of the test chart layers is as follows: $a=-((EFL*(-hj)/(EFL-hj)-(EFL*(-h)/(EFL-h)))$.

According to an embodiment of the present invention, in the above 3D test chart, set n as a parameter which represents a quantity of the test chart layers, set t as a parameter which represents an error tolerance of the photographic arrangement, set s as a parameter which represents a quantity of moving steps of the photographic arrangement, and then a functional equation regarding the quantity of the test pattern payers is as follows: $n=f(t, a, s)$.

According to an embodiment of the present invention, in the above 3D test chart, set d as a parameter which represents a layout of the test patterns, wherein $d_{ij}$ is a parameter which represents a distance from one of the test pattern of the corresponding test chart layer to a center of the test chart layer, set F as a parameter which represents a testing field of view of the photographic arrangement, wherein a functional equation regarding the layout of the test patterns is as follows: $d_{ij}=f(F, h_{ij}, EFL)$.

According to an embodiment of the present invention, in the above 3D test chart, set L as a parameter which represents a size of each cross type test pattern and $L_{ij}$ is a parameter representing a size of ith test pattern of jth test chart layer, set t' as a parameter which represents an error tolerance for manufacturing the 3D test chart, set n' as the parameter which represents an index of refraction of the 3D test chart, set s' as a parameter which represents an allowable disc of confusion during a calculating step of a software, set ΔF as a parameter which represents an allowable range of a span of testing field of view, and a functional equation regarding the size of the test pattern is as follows: $L_{ij}=f(dij, ΔF, t', n', s')$.

According to an embodiment of the present invention, in the above 3D test chart, a shape of the test pattern is selected from the group consisting of a square shape, a triangular shape, a circular shape, an oval shape, a cross shape, a shape of a pair of black and white lines, a star shape and the combination thereof.

According to an embodiment of the present invention, in the above 3D test chart, the 3D test chart comprises 2 to 100 layers of the test chart layers each is provided with 1-1000 the test patterns.

According to an embodiment of the present invention, in the above 3D test chart, the 3D test chart is formed as a chart selected from the group consisting of a transmissive test chart, a reflective test chart, a projection test chart, and a focus zooming and imaging type test chart.

According to an embodiment of the present invention, in the above 3D test chart, each of the test chart layers comprises at least one carrier layer, wherein adjacent the carrier layers are spacedly aligned with each other, wherein each of the test patterns is provided at the corresponding carrier layer.

According to an embodiment of the present invention, in the above 3D test chart, each of the carrier layers is made of transparent material.

According to another aspect of the present invention, the present invention further provides a 3D test chart, wherein the 3D test chart comprises a plurality of test patterns which are arranged in a direction along a depth thereof, wherein the test patterns do not overlap with each other, wherein two adjacent the test patterns are spacedly aligned with each other.

According to an embodiment of the present invention, in the above 3D test chart, further comprising a plurality of carrier layers which are spacedly aligned with each other to form a plurality of test chart layers, wherein each of the test patterns is provided at the corresponding test chart layer.

According to an embodiment of the present invention, in the above 3D test chart, a shape of the test pattern is selected from the group consisting of a square shape, a triangular shape, a circular shape, an oval shape, a cross shape, a shape of a pair of black and white lines, a star shape and the combination thereof.

According to an embodiment of the present invention, in the above 3D test chart, the 3D test chart comprises 2 to 100 layers of the test chart layers each is provided with 1-1000 the test patterns.

According to another aspect of the present invention, the present invention further provides a method of designing a 3D test chart, comprising the following steps: (A) collecting a plurality of parameters of a photographic arrangement to be tested, and determining a position configuration of the 3D test chart; and (B) based on a precision requirement of the photographic arrangement, determining a quantity of test chart layers, and configuring a layout of test patterns of the test chart layers.

According to an embodiment of the present invention, in the above method, the step (B) further comprises a step of determining a size of each of the test patterns.

According to an embodiment of the present invention, in the above method, the step (A) further comprises the steps of setting a as a parameter which represents a precision requirement for fitting a back focus of the photographic arrangement to be tested, setting EFL as a parameter which represents a focal length, setting h as a parameter which represent a position configuration of the 3D test chart, wherein $h_j$ represents a position of jth layer of the test chart layers, and obtaining a functional equation regarding a position configuration of the test chart layers as follows: $a=-((EFL*(-hj)/(EFL-hj)-(EFL*(-h)/(EFL-h)))$.

According to an embodiment of the present invention, in the above method, the step (A) further comprises the steps of setting n as a parameter which represents a quantity of the test chart layers, setting t as a parameter which represents an error tolerance of the photographic arrangement, setting s as a parameter which represents a quantity of moving steps of the photographic arrangement, and obtaining a functional equation regarding the quantity of the test pattern payers as follows: $n=f(t, a, s)$, wherein the step (A) further comprising the steps of setting d as a parameter which represents a layout of the test patterns, wherein $d_{ij}$ is a parameter which represents a distance from one of the test pattern of the corresponding test chart layer to a center of the test chart layer, setting F as a parameter which represents a testing field of view of the photographic arrangement, and obtaining a functional equation regarding the layout of the test patterns as follows: $d_{ij}=f(F, h_{ij}, EFL)$.

According to an embodiment of the present invention, in the above method, further comprising the steps of setting L as a parameter which represents a size of each test pattern and $L_{ij}$ is a parameter representing a size of ith test pattern of jth test chart layer, setting t' as a parameter which represents an error tolerance for manufacturing the 3D test chart, setting n' as the parameter which represents an index of refraction of the 3D test chart, setting s' as a parameter which represents an allowable disc of confusion during a calculating step of a software, setting ΔF as a parameter which represents an allowable range of a span of testing field of view, and obtaining a functional equation regarding the size of the test pattern as follows: $L_{ij}=f(dij, \Delta F, t', n', s')$.

According to an embodiment of the present invention, in the above method, a shape of the test pattern is selected from the group consisting of a square shape, a triangular shape, a circular shape, an oval shape, a cross shape, a shape of a pair of black and white lines, a star shape and the combination thereof.

According to another aspect of the present invention, the present invention further provides a method of forming a 3D test chart, comprising the following steps: (a) determining at least one predetermined area at a test chart layer, providing at least one test pattern at the predetermined area; and (b) overlapping a plurality of the test chart layers in such a manner that the test patterns do not overlap with each other, so as to form the 3D test chart.

According to an embodiment of the present invention, in the above method, further comprising a step of projecting light beams to the test chart layers, wherein a contrast between the test pattern and the corresponding test chart layer is enhanced.

According to an embodiment of the present invention, in the above method, further comprising a step of configuring at least one light source in such a manner that the light source and a photographic arrangement to be tested are respectively provided at two opposite sides of the 3D test chart, wherein light beams of the light sources pass through the test chart layers.

According to an embodiment of the present invention, in the above method, further comprising a step of configuring at least one light source in such a manner that the light source and a photographic arrangement to be tested are provided at a same side of the 3D test chart, wherein light beams of the light sources are reflected by the test patterns.

According to an embodiment of the present invention, in the above method, the light beams reaching to the test chart layers are evenly distributed light beams.

According to another aspect of the present invention, the present invention further provides a method of forming a 3D test chart, comprising a step of configuring a projection source in a light path of a light source in such a manner that when the light source produces light beams, a plurality of test patterns which do not overlap with each other is formed in a predetermined space in a direction along a depth thereof by the projection source, wherein two adjacent the test patterns are spacedly aligned with each other to form the 3D test chart.

According to an embodiment of the present invention, in the above method, the projection source is provided between the light source and the predetermined space.

According to an embodiment of the present invention, in the above method, the projection source comprises a planar test chart and a focus zooming lens set, wherein the planar test chart is provided between the light source and the focus zooming lens set in such a manner that the focus zooming lens set and light beams of the light source are able to project information of the planar test chart to the predetermined space.

According to an embodiment of the present invention, in the above method, the planar test chart comprises at least one testing object which is capable of being projected to the predetermined space by means of the focus zooming lens set, so as to form the test patterns.

According to an embodiment of the present invention, in the above method, a shape of the test pattern is selected from the group consisting of a square shape, a triangular shape, a circular shape, an oval shape, a cross shape, a shape of a pair of black and white lines, a star shape and the combination thereof.

According to another aspect of the present invention, the present invention further provides a method of forming a cross type 3D test chart, comprising a step of configuring a plurality of cross type test patterns which are arranged in a direction along a depth thereof, wherein image elements formed by the corresponding cross type test patterns which are respectively projected into an image do not overlap with each other.

According to an embodiment of the present invention, in the above method, further comprising the steps of: determining at least one predetermined area at a test chart layer, providing at least one the cross type test pattern at the predetermined area; and overlapping a plurality of the test chart layers in such a manner that the cross type test patterns do not overlap with each other, so as to form the 3D test chart.

According to an embodiment of the present invention, in the above method, further comprising the steps of collecting a plurality of parameters of a photographic arrangement to be tested, and determining a position configuration of the cross type 3D test chart and a quantity of the test chart layers.

According to an embodiment of the present invention, in the above method, further comprising the steps of setting a as a parameter which represents a precision requirement for fitting a back focus of the photographic arrangement to be tested, setting EFL as a parameter which represents a focal length, setting h as a parameter which represent a position configuration of the cross type 3D test chart, wherein $h_j$ represents a position of jth layer of the test chart layers, and obtaining a functional equation regarding a position configuration of the test chart layers as follows: $a=-((EFL*(-hj)/(EFL-hj)-(EFL*(-h)/(EFL-h)))$, wherein the method further comprising the steps of setting n as a parameter which represents a quantity of the test chart layers, setting t as a parameter which represents an error tolerance of the photographic arrangement, setting s as a parameter which represents a quantity of moving steps of the photographic arrangement, and obtaining a functional equation regarding the quantity of the test pattern payers as follows: $n=f(t, a, s)$.

According to an embodiment of the present invention, in the above method, further comprising a step of determining a layout of the cross type test patterns.

According to an embodiment of the present invention, in the above method, further comprising the steps of setting d as a parameter which represents a layout of the cross type test patterns, wherein $d_{ij}$ is a parameter which represents a distance from one of the cross type test pattern of the corresponding test chart layer to a center of the test chart layer, setting F as a parameter which represents a testing field of view of the photographic arrangement, and obtaining a functional equation regarding the layout of the cross type test patterns as follows: $d_{ij}=f(F, h_{ij}, EFL)$.

According to an embodiment of the present invention, in the above method, further comprising the steps of setting L as a parameter which represents a size of each cross type test pattern and $L_{ij}$ is a parameter representing a size of ith test pattern of jth test chart layer, setting t' as a parameter which represents an error tolerance for manufacturing the cross type 3D test chart, setting n' as the parameter which represents an index of refraction of the cross type 3D test chart, setting s' as a parameter which represents an allowable disc of confusion during a calculating step of a software, setting ΔF as a parameter which represents an allowable range of a span of testing field of view, and obtaining a functional equation regarding the size of the cross type test pattern as follows: $L_{ij}=f(dij, \Delta F, t', n', s')$.

According to an embodiment of the present invention, in the above method, further comprising a step of configuring a layout of a plurality of cross type image elements in an image generated by a photographic arrangement, and configuring a layout of the cross type test patterns corresponding to the cross type image elements in the image by an inverse projection method.

According to an embodiment of the present invention, in the above method, further comprising a step of configuring a projection source in a light path of a light source in such a manner that when the light source produces light beams, a plurality of the cross type test patterns which do not overlap with each other is formed in a predetermined space in a direction along a depth thereof by the projection source, wherein the projection sources comprises at least one cross type test object.

According to an embodiment of the present invention, in the above method, the projection source comprises a planar test chart and a focus zooming lens set, wherein the planar test chart, which is arranged to provide the cross type test object, is provided between the light source and the focus zooming lens set in such a manner that the focus zooming lens set and light beams of the light source are able to project information of the planar test chart to the predetermined space.

According to an embodiment of the present invention, in the above method, sizes of the cross type test patterns of each of the test chart layer are the same or different.

According to another aspect of the present invention, the present invention provides a cross type 3D test chart comprising a plurality of test chart layers arranged in a direction along a depth thereof, wherein each of the test chart layers is provided with at least one predetermined area each is provided with one or more cross type test patterns, wherein in the direction along the depth, each of the cross type test pattern of one of the test chart layers does not overlap with other the cross type test patterns of other the test chart layers.

According to an embodiment of the present invention, in the above cross type 3D test chart, set a as a parameter which represents a precision requirement for fitting a back focus of a photographic arrangement to be tested, set EFL as a parameter which represents a focal length, set h as a parameter which represent a position configuration of the cross type 3D test chart, wherein $h_j$ represents a position of jth layer of the test chart layers, wherein a functional equation regarding a position configuration of the test chart layers is as follows: a=−((EFL*(−hj)/(EFL−hj)−(EFL*(−h)/(EFL−h))).

According to an embodiment of the present invention, in the above cross type 3D test chart, set n as a parameter which represents a quantity of the test chart layers, set t as a parameter which represents an error tolerance of the photographic arrangement, set s as a parameter which represents a quantity of moving steps of the photographic arrangement, and then a functional equation regarding the quantity of the test pattern payers is as follows: n=f(t, a, s).

According to an embodiment of the present invention, in the above cross type 3D test chart, set d as a parameter which represents a layout of the cross type test patterns, wherein $d_{ij}$ is a parameter which represents a distance from one of the cross type test pattern of the corresponding test chart layer to a center of the test chart layer, set F as a parameter which represents a testing field of view of the photographic arrangement, wherein a functional equation regarding the layout of the test patterns is as follows: $d_{ij}$=f(F, $h_{ij}$, EFL).

According to an embodiment of the present invention, in the above cross type 3D test chart, set L as a parameter which represents a size of each cross type test pattern and $L_{ij}$ is a parameter representing a size of ith test pattern of jth test chart layer, set t' as a parameter which represents an error tolerance for manufacturing the 3D test chart, set n' as the parameter which represents an index of refraction of the 3D test chart, set s' as a parameter which represents an allowable disc of confusion during a calculating step of a software, set ΔF as a parameter which represents an allowable range of a span of testing field of view, and a functional equation regarding the size of the test pattern is as follows: $L_{ij}$=f(dij, ΔF, t', n', s').

According to an embodiment of the present invention, in the above cross type 3D test chart, sizes of the cross type test patterns of each of the test chart layer are the same or different.

According to an embodiment of the present invention, in the above cross type 3D test chart, each of the carrier layers is made of material selected from the group consisting of organic glass, inorganic glass, and transparent display screen.

According to another aspect of the present invention, the present invention further provides a method of testing a photographic arrangement comprising a photographic module and an image sensor, comprising the following steps: (i) configuring a plurality of test patterns in a direction along a depth thereof to provide a plurality of scenes of different depths; (ii) capturing an image information of the plurality of test patterns though shooting the 3D test chart by the photographic arrangement; and (iii) based on the image information, obtaining a focal position of the photographic module, and a tilt vector of the photographic module and the image sensor, and determining a relative position of the photographic module and the image sensor.

According to an embodiment of the present invention, in the above testing method, the step (i) further comprises a step of providing a 3D test chart comprising a plurality of test chart layers which are arranged in the direction along the depth of the 3D test chart, wherein each of the test chart layers is provided with at least one the test pattern, wherein the test patterns do not overlap with each other.

According to an embodiment of the present invention, in the above testing method, the step (i) further comprises a step of collecting a plurality of parameters of a photographic arrangement to be tested, and determining a position configuration of the 3D test chart; and based on a precision requirement of the photographic arrangement, determining a quantity of test chart layers, and configuring a layout of test patterns of the test chart layers.

According to an embodiment of the present invention, in the above testing method, the step (i) further comprises a step of determining a size of each of the test patterns.

According to an embodiment of the present invention, in the above testing method, further comprising the steps of setting a as a parameter which represents a precision requirement for fitting a back focus of the photographic arrangement to be tested, setting EFL as a parameter which represents a focal length, setting h as a parameter which represent a position configuration of the 3D test chart, wherein $h_j$ represents a position of jth layer of the test chart layers, and obtaining a functional equation regarding a position configuration of the test chart layers as follows: a=−((EFL*(−hj)/(EFL−hj)−(EFL*(−h)/(EFL−h))).

According to an embodiment of the present invention, in the above testing method, further comprising the steps of setting n as a parameter which represents a quantity of the test chart layers, setting t as a parameter which represents an error tolerance of the photographic arrangement, setting s as a parameter which represents a quantity of moving steps of the photographic arrangement, and obtaining a functional equation regarding the quantity of the test pattern payers as follows: n=f(t, a, s), wherein the step (A) further comprising the steps of setting d as a parameter which represents a layout of the test patterns, wherein $d_{ij}$ is a parameter which represents a distance from one of the test pattern of the corresponding test chart layer to a center of the test chart layer, setting F as a parameter which represents a testing field of view of the photographic arrangement, and obtaining a functional equation regarding the layout of the test patterns as follows: $d_{ij}$=f(F, $h_{ij}$, EFL).

According to an embodiment of the present invention, in the above testing method, further comprising the steps of setting L as a parameter which represents a size of each test pattern and $L_{ij}$ is a parameter representing a size of ith test pattern of jth test chart layer, setting t' as a parameter which represents an error tolerance for manufacturing the 3D test chart, setting n' as the parameter which represents an index of refraction of the 3D test chart, setting s' as a parameter which represents an allowable disc of confusion during a calculating step of a software, setting ΔF as a parameter which represents an allowable range of a span of testing field of view, and obtaining a functional equation regarding the size of the test pattern as follows: $L_{ij}$=f(dij, ΔF, t', n', s').

According to an embodiment of the present invention, in the above testing method, further comprising the steps of setting $mtf_{(ij)}$ as a parameter representing a resolution value of each of the test patterns, setting ω as a parameter representing a shape of each of the test patterns, setting (h,d) as a parameter representing a position configuration of each of the test patterns, setting s as a parameter representing an intensity of a light source, and then obtaining a functional equation regarding the resolution value of each of the test patterns as follows: $mtf_{(ij)}$=f(ω, h, d, s).

According to an embodiment of the present invention, in the above testing method, a functional equation regarding a relationship between an imaging resolution and a defocus amount of each of the test patterns is as follows:

$$F_0 = F_{(v)}\{mtf_{(o1)}, mtf_{(o2)}, mtf_{(o3)} \ldots tmf_{(0j)}\},$$

$$F_j = F_{(v)}\{mtf_{(i1)}, mtf_{(i2)}, mtf_{(i3)} \ldots mtf_{(ij)}\}.$$

According to an embodiment of the present invention, in the above testing method, a method for evaluating an imaging quality of the photographic arrangement is a method selected from the group consisting of OTF, MTF, SFR, CTF, TV line and the combination thereof.

According to an embodiment of the present invention, in the above testing method, a shape of the test pattern is selected from the group consisting of a square shape, a triangular shape, a circular shape, an oval shape, a cross shape, a shape of a pair of black and white lines, a star shape and the combination thereof.

According to an embodiment of the present invention, in the above testing method, the 3D test chart is formed as a chart selected from the group consisting of a transmissive test chart, a reflective test chart, a projection test chart, and a focus zooming and imaging type test chart.

According to another aspect of the present invention, the present invention further provides a method of adjusting a photographic arrangement, comprising the steps of: ($\alpha$) capturing information of scenes of different depths of a 3D test chart, determining a relative position of a photographic module and an image sensor of the photographic arrangement, and obtaining related data corresponding to the relative position; and ($\beta$) based on the related data, accomplishing an adjusting process of the photographic module and the image sensor.

According to an embodiment of the present invention, in the above adjusting method, the step ($\alpha$) further comprises a step of calculating out a focal point of the photographic module, a tilt vector and a shift vector of the photographic module and the image sensor through a functional equation based on the image information.

According to an embodiment of the present invention, in the above adjusting method, further comprising the steps of setting $mtf_{(ij)}$ as a parameter representing a resolution value of each of the test patterns, setting $\omega$ as a parameter representing a shape of each of the test patterns, setting (h,d) as a parameter representing a position configuration of each of the test patterns, setting s as a parameter representing an intensity of a light source, and then obtaining a functional equation regarding the resolution value of each of the test patterns as follows: $mtf_{(ij)}f(\omega, h, d, s)$.

According to an embodiment of the present invention, in the above adjusting method, a functional equation regarding a relationship between an imaging resolution and a defocus amount of each of the test patterns is as follows:

$$F_0 = F_{(v)}\{mtf_{(01)}, mtf_{(02)}, mtf_{(03)} \ldots tmf_{(0j)}\},$$

$$F_j = F_{(v)}\{mtf_{(i1)}, mtf_{(i2)}, mtf_{(i3)} \ldots mtf_{(ij)}\}.$$

According to an embodiment of the present invention, in the above adjusting method, the step ($\alpha$) further comprises the steps of: ($\alpha$.1) configuring a plurality of test patterns in a direction along a depth thereof to provide the plurality of scenes of different depths; ($\alpha$.2) capturing the image information of the plurality of test patterns though shooting the 3D test chart by the photographic arrangement; and ($\alpha$.3) based on the image information, obtaining a focal position of the photographic module, and a tilt vector and a shift vector of the photographic module and the image sensor, and determining a relative position of the photographic module and the image sensor.

According to another aspect of the present invention, the present invention further provides an adjusting arrangement for adjusting a photographic arrangement, comprising: a 3D test chart comprising a plurality of test patterns which are arranged in a direction along a depth thereof, wherein the test patterns do not overlap with each other, wherein two adjacent the test patterns are spacedly aligned with each other, wherein the photographic arrangement is arranged to shoot the 3D test chart to obtain an image containing information of scenes of different depths provided by the test patterns; and an adjusting unit for accomplishing an adjusting process of the photographic arrangement based on data provided by the information of scenes of different depths.

According to an embodiment of the present invention, in the above adjusting arrangement, further comprising a plurality of test chart layers each is provided with at least one the test pattern, wherein each of the test pattern of one of the test chart layers does not overlap with other the test patterns of other the test chart layers.

According to an embodiment of the present invention, in the above adjusting arrangement, a shape of the test pattern is selected from the group consisting of a square shape, a triangular shape, a circular shape, an oval shape, a cross shape, a shape of a pair of black and white lines, a star shape and the combination thereof.

According to an embodiment of the present invention, in the above adjusting arrangement, the 3D test chart is formed as a chart selected from the group consisting of a transmissive test chart, a reflective test chart, a projection test chart, and a focus zooming and imaging type test chart.

According to an embodiment of the present invention, in the above adjusting arrangement, further comprising a light source, wherein the light source and the photographic arrangement are respectively provided at two opposite sides of the 3D test chart.

According to an embodiment of the present invention, in the above adjusting arrangement, further comprising a light source, wherein the light source and the photographic arrangement are provided at a same side of the 3D test chart.

Still further objects and advantages will become apparent from a consideration of the ensuing description and drawings.

These and other objectives, features, and advantages of the present invention will become apparent from the following detailed description, the accompanying drawings, and the appended claims.

BRIEF DESCRIPTION OF THE DRAWINGS

FIG. 40 is a flow chart illustrating the adjusting process of the present invention.

DETAILED DESCRIPTION OF THE PREFERRED EMBODIMENT

The following description is disclosed to enable any person skilled in the art to make and use the present invention. Preferred embodiments are provided in the following description only as examples and modifications will be apparent to those skilled in the art. The general principles defined in the following description would be applied to other embodiments, alternatives, modifications, equivalents, and applications without departing from the spirit and scope of the present invention.

Figure 1:
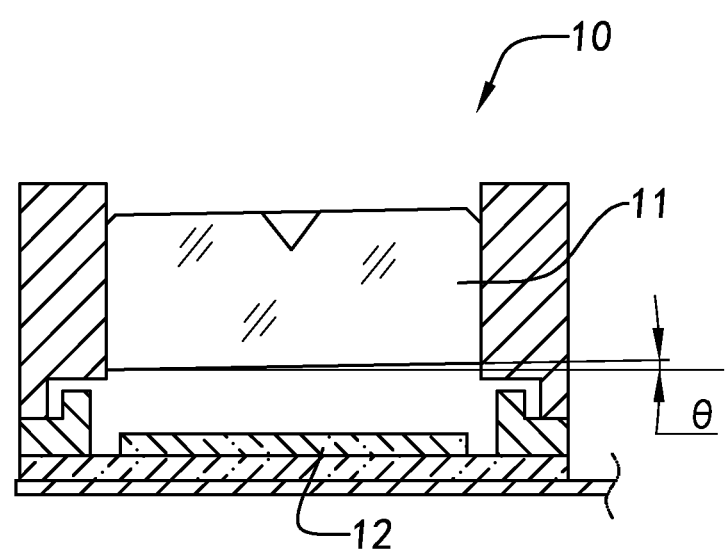
FIG. 1 is a schematic view illustrating the relationship between the photographic module and the image sensor of a photographic arrangement.

The present invention provides a 3D test chart 100 which is arranged for testing a photographic arrangement 10. The photographic arrangement 10 comprises a photographic module 11, an image sensor 12 and other possible components such as a holder. Accordingly, the photographic module 11 and the image sensor 12 are packaged and assembled to form the photographic arrangement 10. When packing the photographic module 11 with the image sensor 12, because the tilt of the image plane of the photographic module 11, as well as the tilt error of other components of the photographic arrangement 10 and the limit of the accuracy of the packaging procedure, it is required to test the focal length of the photographic arrangement 10 and the tilt of the image plane of the photographic module 11 and the image sensor 12, so as to obtain related data for adjusting the relative position of the photographic module 11 and the image sensor 12 based on the data, so that the imaging quality of the photographic arrangement 10 is ensured after the packaging procedure. FIG. 1 illustrates a situation when the photographic module 11 and the image sensor 12 are not correctly aligned with each other before an adjusting process, because a tilt exists between the photographic module 11 and the image sensor 12, i.e. an optical axis of the photographic module 11 is not vertical to a light receiving surface of the image sensor 12, and is not aligned with an optical axis of the image sensor 12, causing the light beams reflected from an object and captured by the photographic module 11 being not able to evenly received by the image sensor 12, and resulting in the blurring of the images provided by the photographic arrangement 10. The person of ordinary skilled in the art should be understand that besides the mismatch of the photographic module 11 and the image sensor 12 as an example shown in FIG. 1, there are other errors such as the image inclination of the photographic module 11 itself.

Referring to FIGS. 3 to 16 of the drawings, the 3D test chart 100 of the present invention comprises a plurality of test chart layers 20 each comprising at least one test pattern 21, so that the plurality of test patterns 21 provides scene information of different depths. When testing the photographic arrangement 10, the photographic module 11 captures light beams carried with information of each of the test patterns along various different depths, and then the light beams are received by the image sensor 12 and undergoes a photoelectric transformation process, and dada information reflecting the tilt of the photographic module 11 and the image sensor 12 is obtained for facilitating the subsequent adjusting process of the photographic module 11 and the image sensor 12.

It is worth mentioning that the parameters of the 3D test chart 100 can be determined according to the type of the photographic arrangement 10, these parameters of the 3D test chart 100 can be the number of the test chart layers 20, the distance between adjacent test chart layers 20, the position of the 3D test chart 100, or the shape, size, position, and the density of each test pattern 21.

Figure 2:
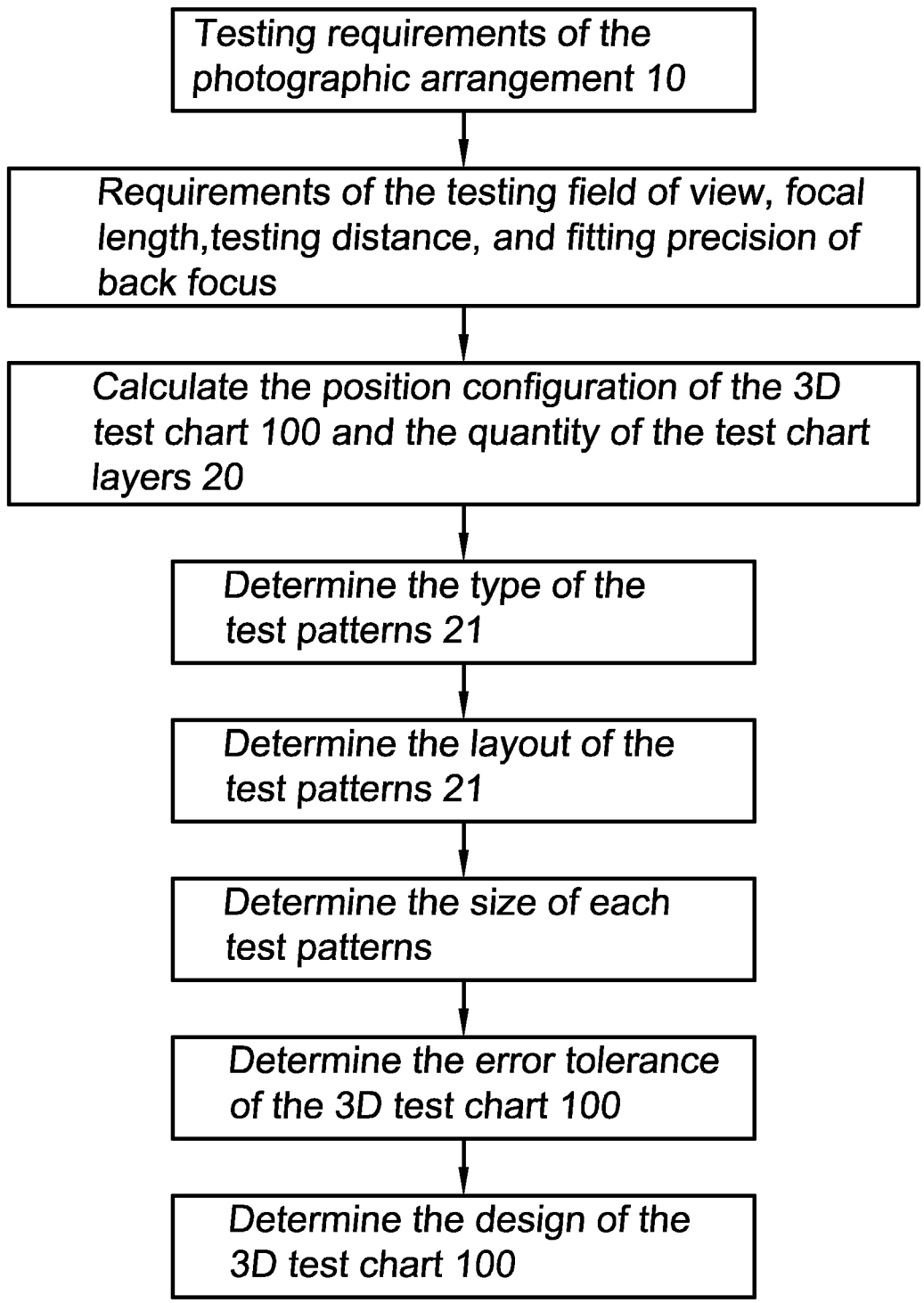
FIG. 2 is a flow chart illustrating a process for designing the parameters of the 3D test chart of the present invention.

FIG. 2 is a flow chart illustrating the designing of the 3D test chart 100. More specifically, when the type of the photographic arrangement 10 to be tested is determined, some testing parameters of the photographic arrangement 10, such as the testing field of view, the focal length, the testing distance, and the precision requirement for fitting the back focus, should be measured. In order to facilitate the description of the relationship between the parameters of the 3D test chart 100 of the photographic arrangement 10, set F as the parameter which represents the testing field of view, set EFL as the parameter which represents the focal length of the photographic arrangement 10, and set a as the parameter which represents the precision requirement for fitting the back focus of the photographic arrangement 10. Accordingly, the parameter a reflecting the precision requirement for fitting the back focus is determined by the actual fitting requirement which depends on the processing requirement of the software. Furthermore, set Z as the parameter which represents the testing distance of the 3D test chart 100, and $Z_j$ represents the testing distance of the jth layer of the test chart layers 20, the range of the values of j is that j>=2, while $Z_1$ represents the testing distance of the first layer of the test chart layers 20 which is the test patter layer 20 of the 3D test chart farthest from the photographic module 11, meanwhile, $Z_1$ is determined when the type of the photographic arrangement 10 is selected. In other words, when the type of the photographic arrangement 10 to be tested is determined, the testing distance of the first layer of the test chart layers 20 is determined at the same time. Furthermore, when the related parameters of the photographic arrangement 10 are obtained, the parameters are used to calculate the position of the 3D test chart and the number of the layers of the test chart layers 20. More specifically, set h as the parameter which represent the position of the 3D test chart 100, then $h_j$ represents the position of the jth layer of the test chart layers 20, and similarly the range of the values of j is that j>=2, the functional equation reflecting the position of the test chart layers is that a=−((EFL*(−hj)/(EFL−hj)−(EFL*(−h)/(EFL−h))). Accordingly, based on the above functional equation, the value of $h_j$ can be calculated to determine the position of each test chart layer 20 of the 3D test chart 100.

Furthermore, set n as the parameter which represents the number of the layers of the test chart layers 20, set t as the parameter which represents the error tolerance of the photographic arrangement 10 which is predetermined by the manufacturing process, accordingly, the parameter t contains but not limited to error tolerances of the height, the tilt, and the shift of the photographic arrangement 10. In addition, set s as the parameter which represents the number of the moving steps of the photographic arrangement 10. It is worth mentioning that in some examples, the range of the values of the number of the moving steps of the photographic arrangement 10 can be that s>=1. In other words, only one single moving step may be required to move the photographic arrangement 10 for obtaining the corresponding data. Accordingly, the functional equation regarding the number of the layers of the test pattern payers 20 can be as follows: n=f(t, a, s). Thus, the value of the parameter of n can be calculated based on the above formula to calculate the number of the required test chart layers 20. In addition, in other possible examples, the photographic arrangement 10 may not require moving before obtaining the data.

Accordingly, after determining the position of the 3D test chart and the number of the layers of the test chart layers, the shape, position and size of each test pattern 21 can be determined in the following step. According to an example of the present invention, the shape of each test pattern 21 is not limited and may be embodied as a shape selected from the group consisting of a square shape, a triangular shape, a circular shape, an oval shape, a cross shape, a shape of a pair of black and white lines, a star shape and the combination thereof. It is worth mentioning that the shape of each test pattern can be any graph which can be used to calculate the imaging quality of the photographic arrangement 10, including any tangible icons and icons with color difference.

Figure 3:
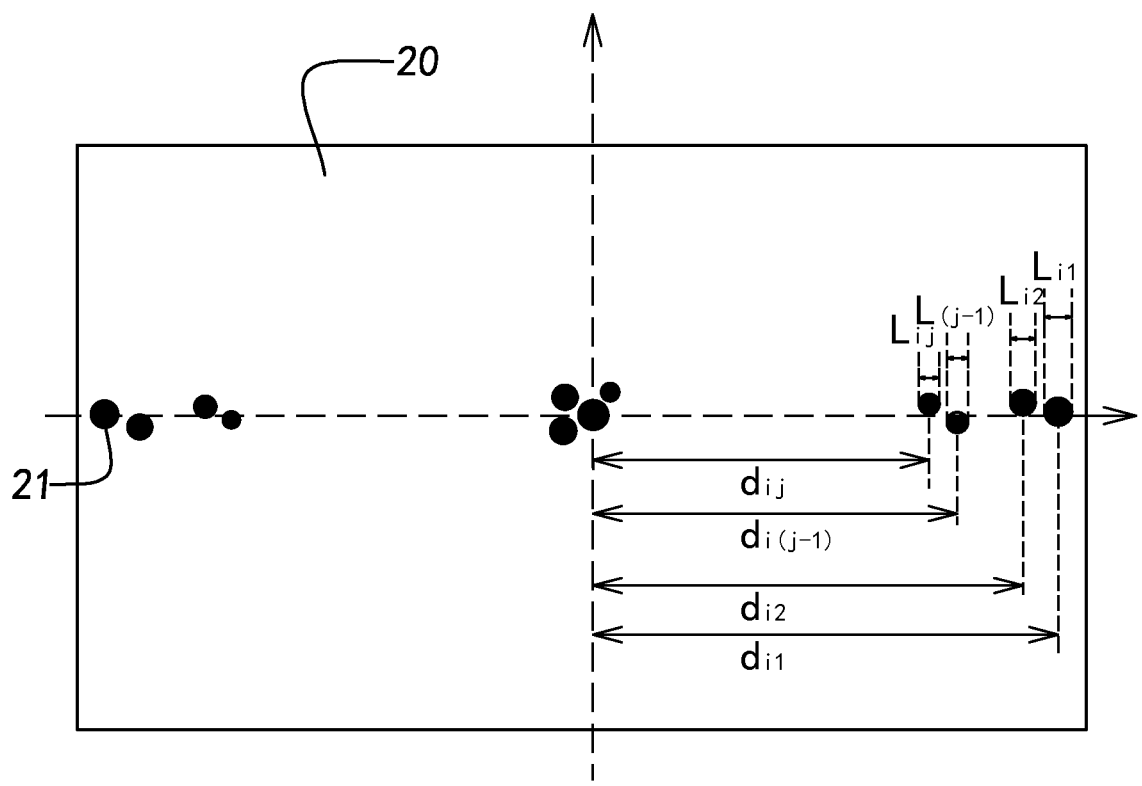
FIG. 3 is a schematic view illustrating a layout of the test patterns of the test chart layers of the 3D test chart of the present invention.

As an example, referring to FIG. 3 of the drawings, set d as the parameter which represents the layout of the test patterns 21 of the 3D test chart 100. More specifically, the parameter d of the test patterns 21 represents the density of the test patterns 21. Accordingly, set $d_{ij}$ as a parameter which represents a distance from a test pattern 21 of a test chart layer 20 to a center of the test chart layer 20, wherein i represents the position of the test pattern 21 which is located at the test chart layer 20, j represents the number of the test chart layer, so that $d_{ij}$ represents the layout of the ith test pattern 21 of the jth test chart layer 20, and the functional equation representing the layout of the test patterns is as follows: $d_{ij}$=f'(F, $h_{ij}$, EFL). It is worth mentioning that the testing field of view F is determined by the photographic arrangement 10 to be tested, $h_{ij}$ can be obtained by the above functional equation reflecting the position configuration of the 3D test chart. Therefore, the above functional formula can be used to calculate the value of $d_{ij}$, and thus the layout of the test patterns 21 can be determined. In other words, the density of the test patterns 21 of each test chart layer 20 can be obtained based on the above functional formula. It is worth mentioning that the density of the test patterns 21 of the test chart layers 20 can be the same, or also can be different.

Furthermore, referring to FIG. 3 of the drawings, set L as the parameter which represents the size of each test pattern 21. Accordingly, $L_{ij}$ can be the parameter which represents the size of one of the test patterns 21, i.e. $L_{ij}$ is the parameter representing the size of the ith test pattern 21 of the jth test chart layer 20. Accordingly, $d_{ij}$ is the parameter which represents the distance from a test pattern 21 of a test chart layer 20 to a center of the test chart layer 20. Furthermore, set ΔF as the parameter which represents the allowable range of the span of testing field of view, set t' as the parameter which represents the error tolerance for manufacturing the 3D test chart 100, set n' as the parameter which represents the index of refraction of the 3D test chart 100, set s' as the parameter which represents the allowable disc of confusion during a calculating step of a software, and a functional equation regarding the size of the test pattern 21 is as follows: $L_{ij}$=f''(dij, ΔF, t', n', s'). Accordingly, the size of each test pattern 21 can be obtained by calculating the value of $L_{ij}$ based on the above mentioned functional equation.

It is worth mentioning that the process for calculating the size $L_{ij}$ of the test pattern 21 is a procedure for balancing each parameter of the 3D test chart with the error tolerance for manufacturing the 3D test chart 100, and when the size $L_{ij}$ of the test pattern 21 is determined, the error tolerance for manufacturing the 3D test chart 100 is determined. It is still worth mentioning that when the parameters of the 3D test chart are determined, the 3D test chart can be manufactured based on these parameters.

Figure 37:
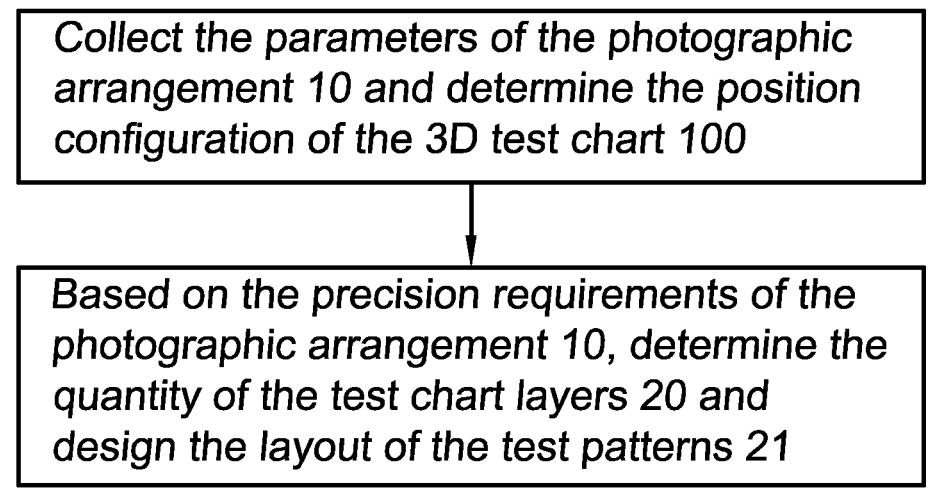
FIG. 37 is a flow chart illustrating the design of the 3D test chart of the present invention.

Accordingly, referring to FIG. 37, the present invention provides a method for manufacturing the 3D test chart, wherein the method comprises the following steps.

(A) Collect the parameters of the photographic arrangement 10 to be tested, and determine the position of the 3D test chart 100.

(B) Determine the number of the layers of the test chart layers of the 3D test chart, and design the layout of the test patterns of the test chart layers according to the precision requirement of the photographic arrangement 10.

More specifically, in the step (A), when the type of the photographic arrangement 10 to be tested is determined, the parameters of the photographic arrangement 10, which including the test field of view, the focal length, and the precision requirement for fitting the back focus, are required to be collected. The person of ordinary skilled in the art should understand that other parameters of the photographic arrangement 10 to be tested can be collected according to different requirements, so that more parameters of the photographic arrangement 10 are obtained to optimize the design of the 3D test chart 100.

Furthermore, in the step (B), the method further comprises a step of determining the size of each test pattern 21.

Preferably, in the step (A), set a as the parameter which represents the precision requirement for fitting the back focus of the photographic arrangement 10 to be tested, set EFL as the parameter which represents the focal length, set h as the parameter which represent the position of the 3D test chart 100, then $h_j$ represents the position of the jth layer of the test chart layers 20, and the functional equation reflecting the position of the test chart layers is as follows: a=-((EFL*(-hj)/(EFL-hj)-(EFL*(-h)/(EFL-h))). Accordingly, based on the above functional equation, the value of $h_j$ can be calculated to determine the position of each test chart layer 20 of the 3D test chart 100.

Preferably, in the step (A), set n as the parameter which represents the number of the layers of the test chart layers 20, set t as the parameter which represents the error tolerance of the photographic arrangement 10 which is predetermined by the manufacturing process, set s as the parameter which represents the number of the moving steps of the photographic arrangement 10, and then obtain the functional equation regarding the number of the layers of the test pattern payers 20 as follows: n=f(t, a, s). In addition, set d as the parameter which represents the layout of the test patterns 21 of the 3D test chart 100, and $d_{ij}$ is a parameter which represents a distance from a test pattern 21 of a test chart layer 20 to a center of the test chart layer 20, set F as the parameter which represents the testing field of view of the photographic arrangement 10, and obtain the functional equation representing the layout of the test patterns as follows: $d_{ij}$=f'(F, $h_{ij}$, EFL). Thus, the value of the parameters of n and $d_{ij}$ can be respectively calculated based on the above formulas to calculate the number of the required test chart layers 20 and the layout of the test patterns 21.

Preferably, set L as the parameter which represents the size of each test pattern 21 and $L_{ij}$ can be the parameter representing the size of the ith test pattern 21 of the jth test chart layer 20, set t' as the parameter which represents the error tolerance for manufacturing the 3D test chart 100, set n' as the parameter which represents the index of refraction of the 3D test chart 100, set s' as the parameter which represents the allowable disc of confusion during a calculating step of a software, set ΔF as the parameter which represents the allowable range of the span of testing field of view, and then obtain a functional equation regarding the size of the test pattern 21 as follows: $L_{ij}$=f''(dij, ΔF, t', n', s'). Accordingly, the size of each test pattern 21 can be obtained by calculating the value of $L_{ij}$ based on the above functional equation.

Accordingly, each test pattern 21 of one of the test chart layers 20 does not overlap with test patterns 21 of other test chart layers 20 along the direction of the depth thereof, so that when the photographic module 11 captures information of each test pattern 21, the test patterns 21 adjacent to the photographic module 11 will not block the light beams reflected or transmitted through the test patterns which are relatively far from the photographic module 11. As an example, according to an embodiment of the present invention, each test pattern 21 of each test chart layer 20 is configured to have an upset trapezoid shape. In other words, the distance from the test pattern 21 to the center of the corresponding test chart layer 20 is gradually decreased from the test patterns 21 far away from the photographic module 11 to the test patterns 21 adjacent to the photographic module 11, as shown in FIG. 4 of the drawings, and thus the information of each test pattern 21 of each test chart layer 20 can be captured by the photographic module 11, so as to provide an image with depth information.

In other words, the 3D test chart 100 has a plurality of test patterns 21 along the depth thereof which are not overlapping with each other, and two adjacent test patterns 21 are spacedly arranged to form the 3D test chart 100. Accordingly, as an example, each test chart layer 21 is embodied to have a carrier for carrying the test patterns 21. As another example, each test pattern 21 may be formed by a projection method.

Figure 4:
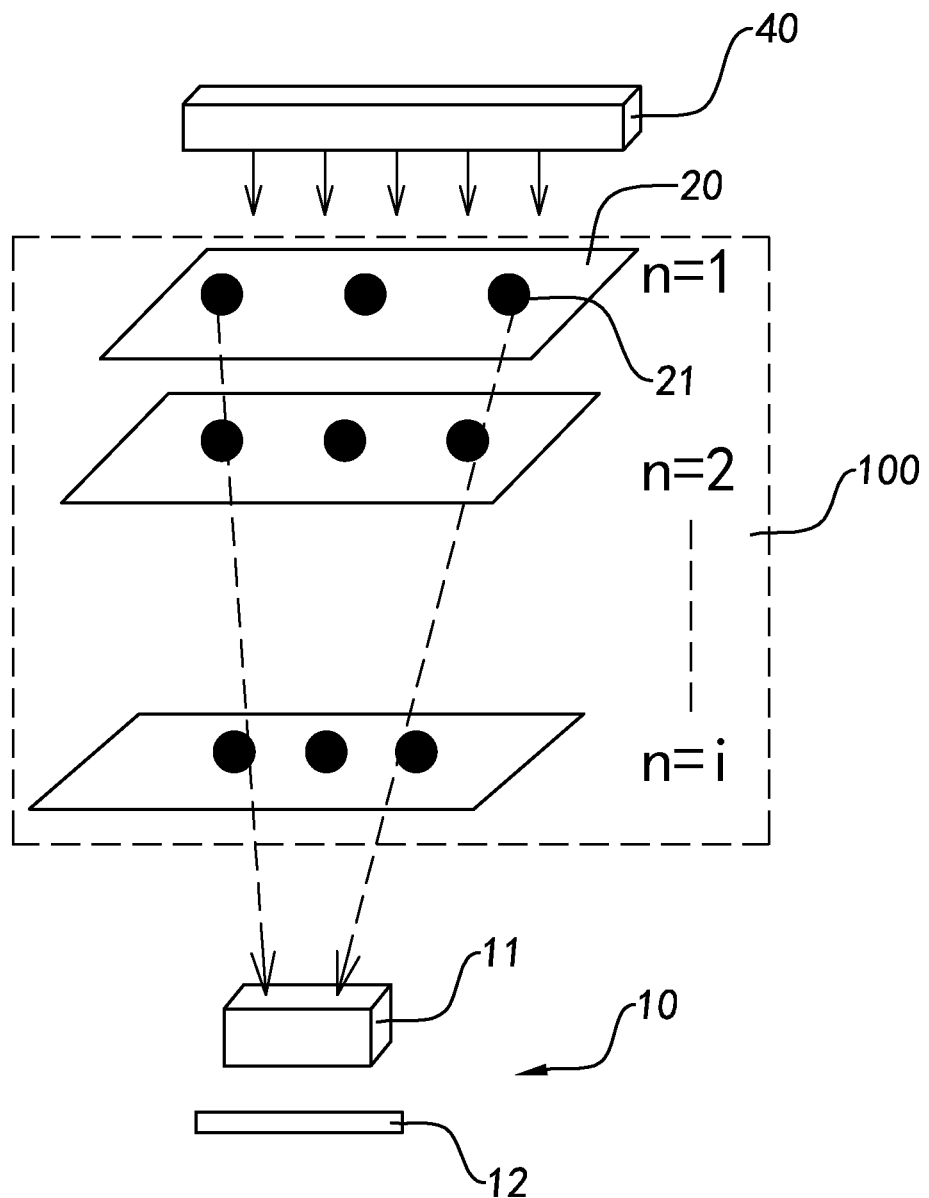
FIGS. 4, 5 and 6 are schematic views illustrating the 3D test chart according to a first preferred embodiment of the present invention.
Figure 5:
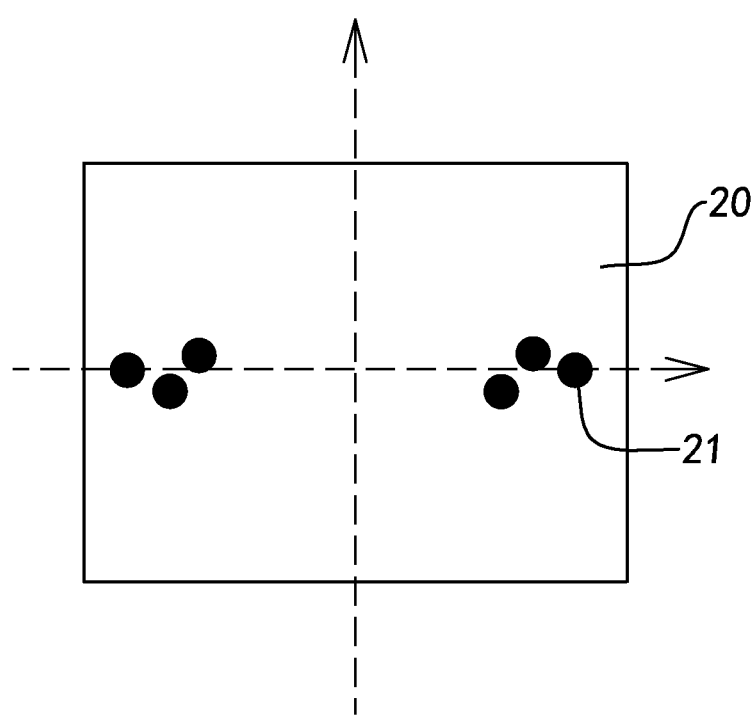
Figure 6:
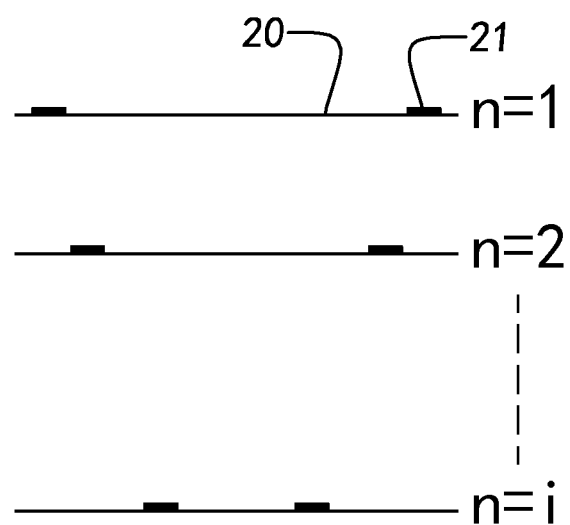

Referring to FIGS. 4, 5 and 6 of the drawings, a 3D test chart and its application according to a first preferred embodiment of the present invention is illustrated. The 3D test chart 100 comprises a plurality of test chart layers 20 which are arranged in a direction along a depth thereof, each test chart layer 20 is provided with at least one test pattern 21, and the test pattern 21 of any test chart layer 20 does not overlap with test patterns 21 of other test chart layers 20 in the direction along the depth thereof. In addition, each test pattern 21 is distinguishable from the corresponding test chart layer 20, so that each test pattern 21 can be easily identified and captured by the photographic module 11. For example, a color contrast is produced between each test pattern 21 and the corresponding test chart layer 20.

Preferably, each test chart layer 20 can be made of transparent material, so as to reduce the index of the refraction of each test chart layer 20 as much as possible, and each test pattern 21 of the corresponding test chart layer 20 can be identified and captured by the photographic module 11. In other words, light beams carrying information of one test pattern 21 can pass through other test chart layers 20 without being blocked, so as to be captured by the photographic module 11, so that the photographic arrangement 10 can obtain image of the 3D test chart with information of scenes of different depths.

Referring to FIG. 4 of the drawings, the 3D test chart 100 may be embodied as a transmissive 3D test chart for testing the photographic arrangement 10. More specifically, a light source 40 is aligned with the 3D test chart 100 in such a manner that the 3D test chart 100 is at a position between the light source 40 and the photographic arrangement 10 when the photographic arrangement 10 is being tested, so that the light beams of the light source 40 pass through the test chart layers 20 and enhance the contrast between the test pattern 21 and the corresponding test chart layer 20, so that each test pattern 21 can be easily identified and captured by the photographic module 11.

FIGS. 5 and 6 are respectively top view and side view of the 3D test chart 100, a person of ordinary skilled in the art can easily understand the configuration of the test patterns 21 of the test chart layers 20.

Accordingly, during the testing process, the light source 40 produces evenly projected light beams which pass through each test chart layer 20 for enhancing the contrast between the test pattern 21 and the corresponding test chart layer 20. It is worth mentioning that all of the light beams passing through the test chart layers with the same performance for enhancing the contrast between the test pattern 21 and the corresponding test chart layer 20, so that when the photographic module 11 receives the light beams, the light beams carrying with the information of the test patterns can be received by the image sensor 12 and then undergo a photoelectric transformation process.

Accordingly, FIGS. 7 to 10 illustrate a 3D test chart 100 and its application according to a second preferred embodiment of the present invention. The 3D test chart 100 comprises a plurality of test chart layers 20A which are arranged in a direction along a depth thereof, each test chart layer 20A is provided with at least one test pattern 21A, and the test pattern 21A of any test chart layer 20A does not overlap with test patterns 21A of other test chart layers 20A in the direction along the depth thereof. In addition, each test pattern 21A is distinguishable from the corresponding test chart layer 20A, so that each test pattern 21A can be easily identified and captured by the photographic module 11A. For example, a color contrast is produced between each test pattern 21A and the corresponding test chart layer 20A.

Figure 7:
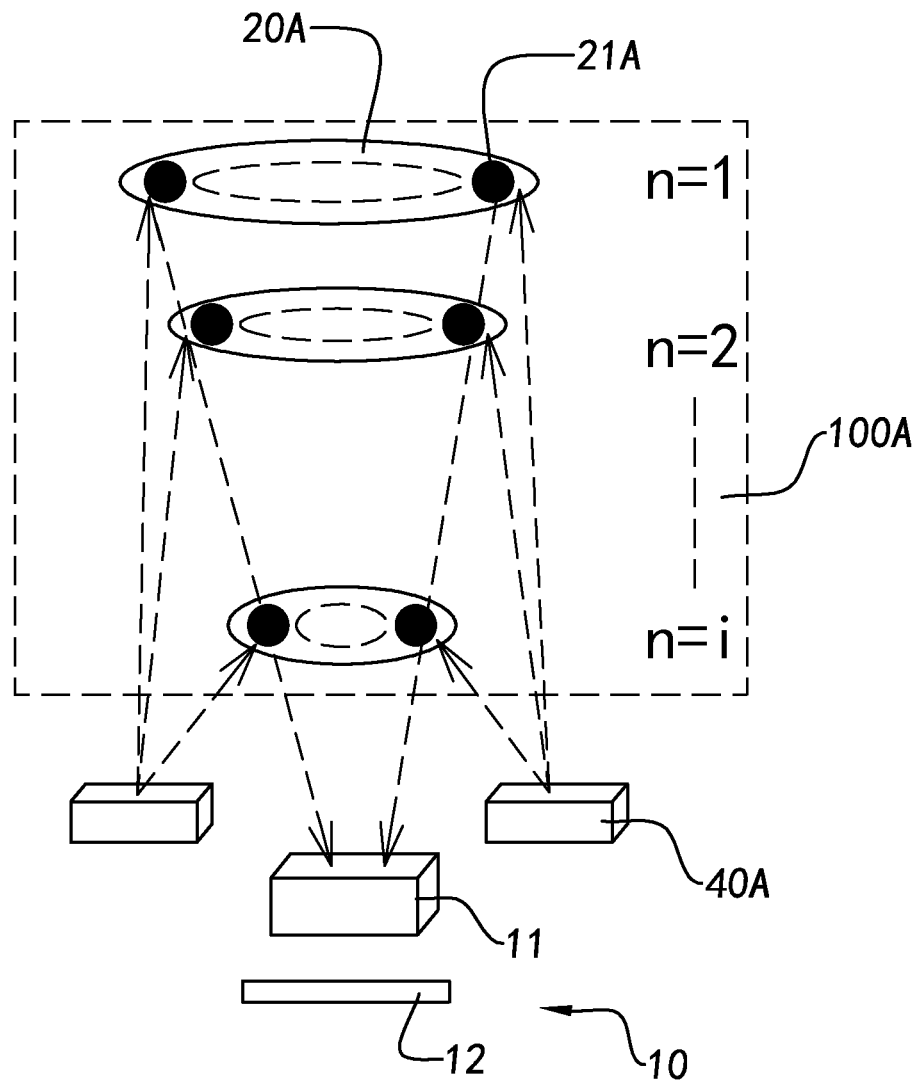
FIGS. 7, 8, 9 and 10 are schematic views illustrating the 3D test chart according to a second preferred embodiment of the present invention.
Figure 8:
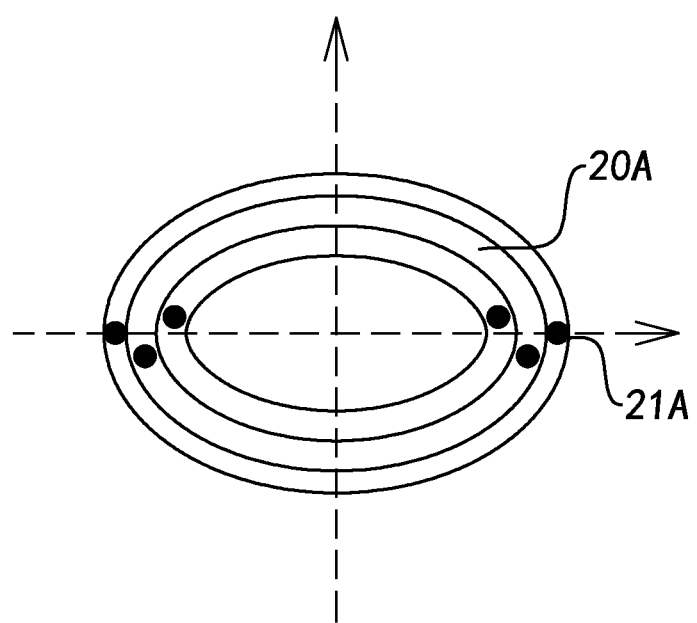

Furthermore, referring to FIG. 7 of the drawings, the 3D test chart 100 is a reflective 3D test chart for testing the photographic arrangement 10. More specifically, a light source 40A is provided and the 3D test chart 100 is provided at a position aligning with the light source 40A for reflecting the light beams of the light source 40A. For instance, two or more light sources 40A may be provided and light beams can evenly pass through the test chart layers 20 and reflected by the test patterns 21. As shown in the drawings of this embodiment, when testing the photographic arrangement 10, the 3D test chart 100 of this embodiment is shown be provided above the light sources 40A and the photographic arrangement 10, the light sources 40A may be provided around the photographic module 11. It is worth mentioning that the person of ordinary skilled in the art shall understand that the distance and location relationship between the light sources 40A, the photographic module 11, and the 3D test chart 100 can be adjusted according to actual requirements. For example, the light sources 40A and the photographic module 11 may be arranged at a lateral side of the 3D test chart 100.

Accordingly, the light beams produced by the light sources 40A are evenly projected, and then pass through the test chart layer 20A and produce the contrast between each test pattern 21A and the corresponding test chart layer 20A, so that each test pattern 21A can be easily identified and captured by the photographic module 11.

Figure 9:
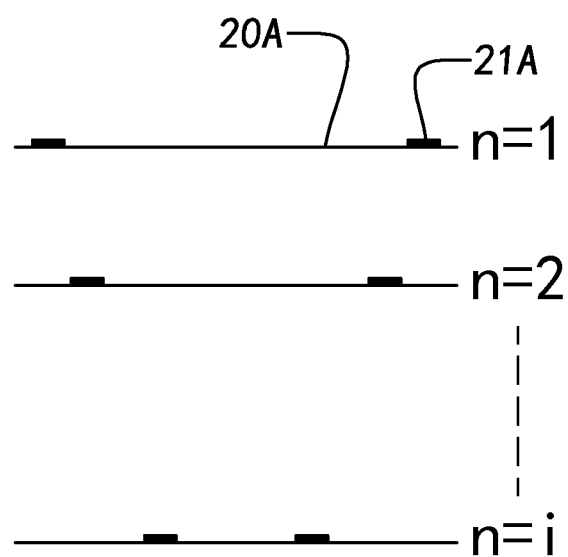
Figure 10:
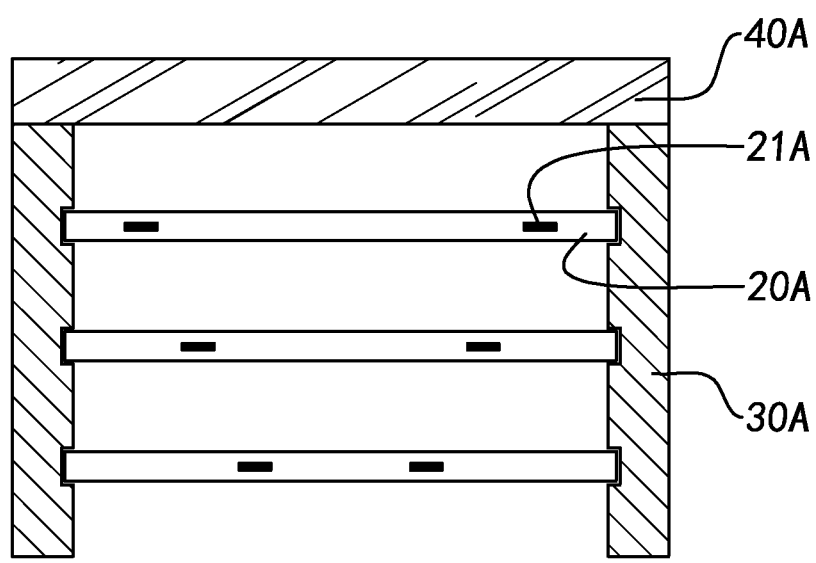

FIGS. 9 and 10 are respectively top view and side view of the 3D test chart 100, a person of ordinary skilled in the art can easily understand the configuration of the test patterns 21A of the test chart layers 20A of this embodiment.

It is worth mentioning that the difference between the second embodiment shown in FIG. 7 and the first embodiment shown in FIG. 4 is that light beams of the light source 40 penetrate through the 3D test chart and then are captured by the photographic module 11, while the light beams of the light sources 40A projecting towards the 3D test chart 100 are reflected by the test patterns 21A so as to produce the contrast between each test pattern 21A and the corresponding test chart layer 20A.

According to an embodiment of the present invention, each test chart layer 20A may be made of tangible material, or can be formed by a projection method. According to the example shown in FIG. 10, test chart layers 20A of the 3D test chart 100 are embodied to be formed by a plurality of carrier carriers 30A which are overlappedly and spacedly aligned with each other. Accordingly, the distance between adjacent carrier layers 30A determines the distance between adjacent test chart layers 20A, the material and the thickness of each carrier member 30A directly have influence on the index of refraction of the 3D test chart 100A. Therefore, the influence of the index of refraction of the 3D test chart 100A acting on the performance should be considered when selecting the material and thickness of each carrier layer 30A. It is still worth mentioning that each carrier layer 30A can be made of transparent material, so that the 3D test chart can be embodied either as a transmissive test chart 100 or a reflective test chart 100A, and each test pattern 21A of the corresponding test chart layer 20A can be identified and captured by the photographic module 11, so as to ensure the accuracy of the testing result.

Furthermore, each test pattern 21A can be provided or formed at each carrier layer 30A, so as to form a plurality of test patterns 21A which does not overlap with each other in the direction along the depth thereof. More specifically, as an example, the test pattern 21A can be provided at at least one predetermined area of each carrier layer 30A, and the quantity, size and shape of the predetermined area can be obtained based on the functional equation regarding the test patterns 21A, so that each test pattern 21A is distinguishable from the corresponding carrier layer 30A, so that it is convenient for the photographic module 11 to identify and capture the information of the test patterns 21A.

According to another example of the present invention, the predetermined area of the carrier layer 30A can be selected, and then some chemical or physical treating process is introduced to make the predetermined area distinguishable from other areas, so as to form the test patterns 21A. It is appreciated that other possible method can be employed to form the test patterns 21A at the test chart layers 20A formed by the carrier layers 30A.

Figure 38:
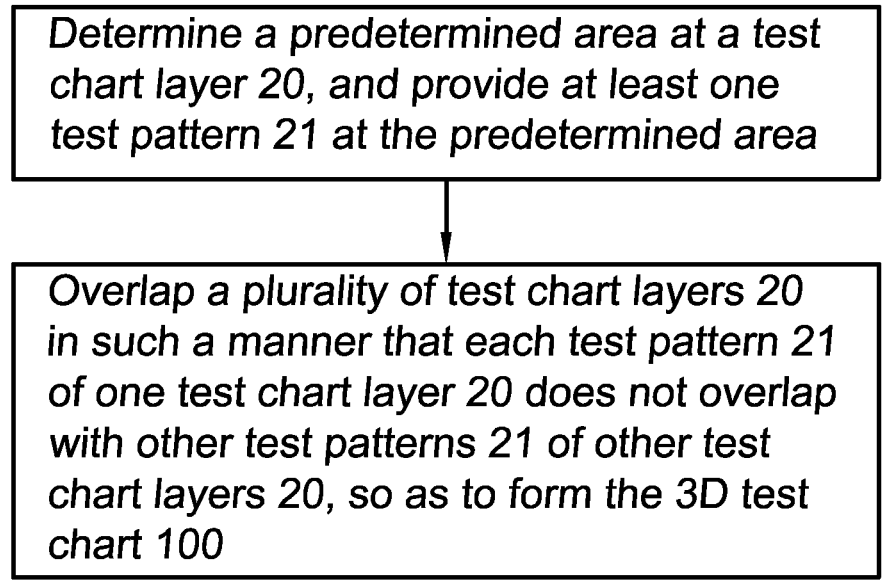
FIG. 38 is a flow chart illustrating the formation of the 3D test chart of the present invention.

Accordingly, as shown in FIG. 38, the present invention further provides a method for forming the 3D test chart 100A of the present invention, wherein the method comprises the following steps.

(a) Determine a predetermined area of a test chart layer 20A, and provide at least one test pattern 21A at the predetermined area.

(b) Overlappedly align a plurality of test chart layers 20A in such a manner that each test pattern 21A of each test chart layer 20A does not overlap with other test patterns 21A of other test chart layers 20A, so as to form the 3D test chart.

Preferably, in the step (b), light beams passing through each test chart layer 20A enhance the contrast between each test pattern 21A and the corresponding test chart layer 20A.

Preferably, in the above method, the 3D test chart 100A may be provided between the light source 40A and the photographic arrangement 10, and light beams of the light sources 40A pass through the test chart layers 20A before reaching to the photographic arrangement 10.

Preferably, in the above method, one or more light sources 40A can be arranged with the photographic arrangement 10 at the same side of the 3D test chart 100A, so that light beams can be reflected by the test patterns 21A.

It is worth mentioning that light beams are evenly distributed to the test chart layers 20A, and it is even worth mentioning that the quantity, size and shape of the predetermine area can be obtained by calculating the functional equation regarding the test patterns 21A.

Referring to FIGS. 11 to 14 of the drawings, this embodiment uses a projection method to form the 3D test chart 100. In comparison with the embodiments illustrated in FIGS. 4 to 7 of the drawings, the 3D test chart of this embodiment does not require the carrier layers 30A for carrying the test patterns 21.

Figure 11:
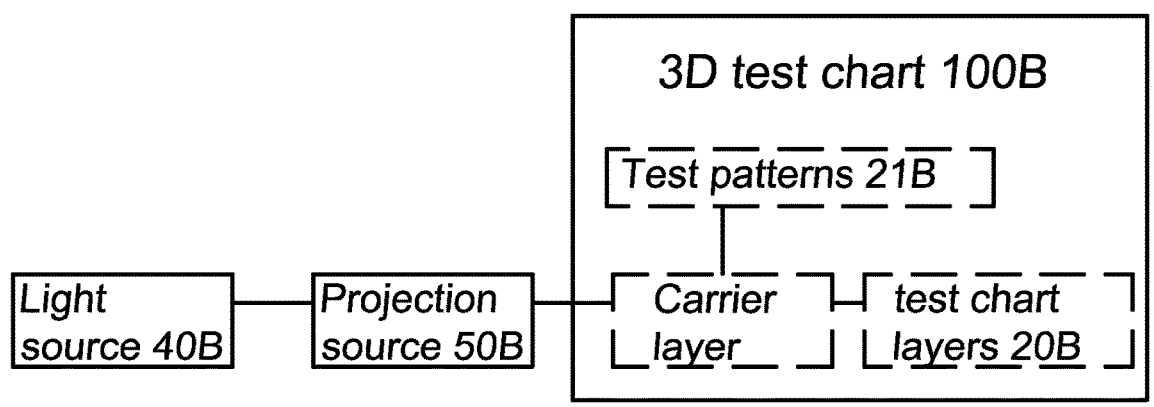
FIGS. 11, 12, 13 and 14 are schematic views illustrating the 3D test chart according to a third preferred embodiment of the present invention.

As a detailed example, referring to FIG. 11 of the drawings, the 3D test chart 100B comprises a light source 40B and a projection source 50B which is provided at a light path of the light source 40B. In other words, the light beams reach to the projection source 50B and then project out to form scenes of different depths in a predetermined space for facilitating the subsequent testing process of the photographic arrangement 10B.

Figure 12:
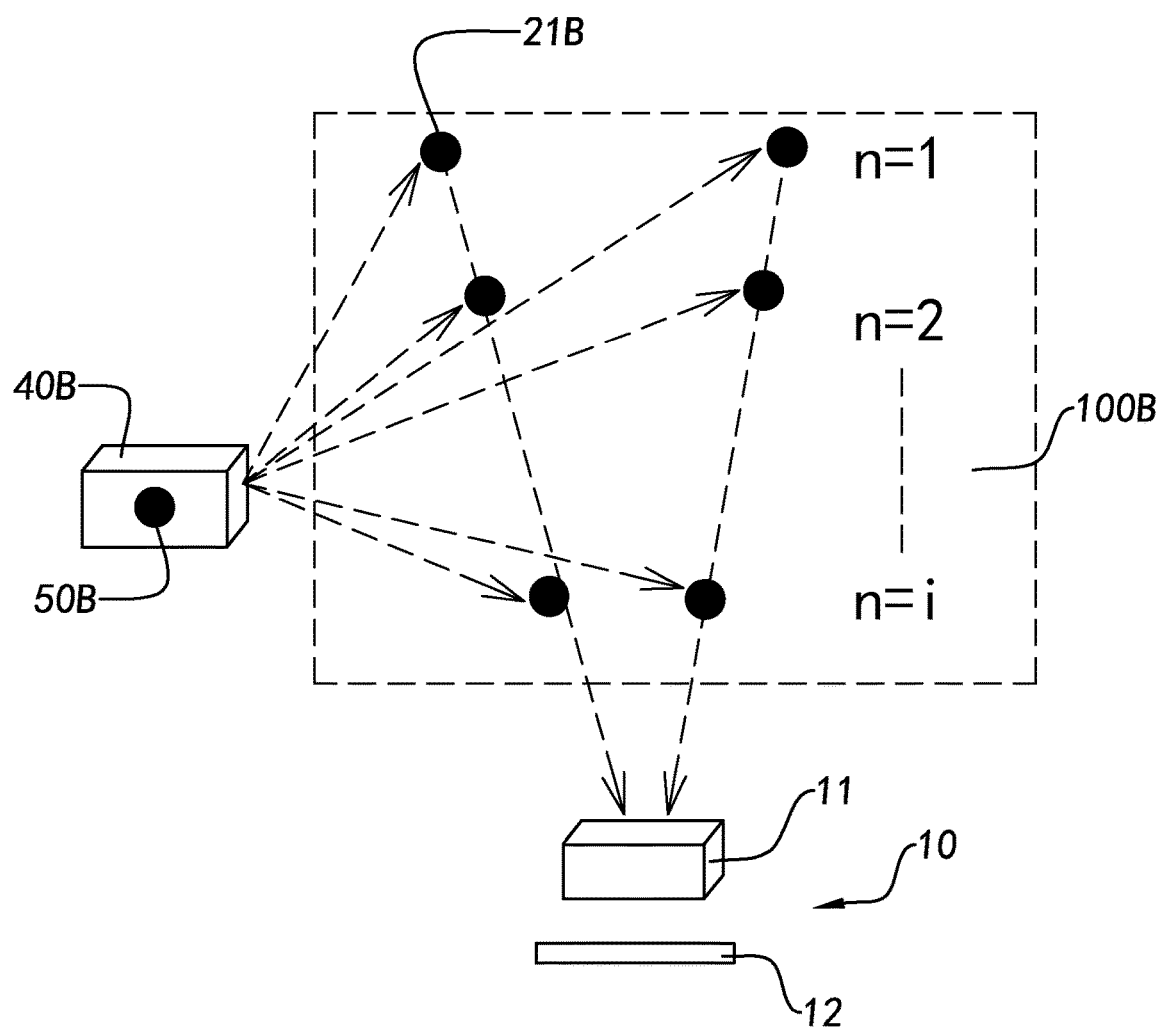

Accordingly, the present invention provides a method for forming the 3D test chart 100B, wherein the method comprises a step of providing the projection source 50B in the light path of the light beams of the light source 40B, and forming a plurality of test patterns 21B which do not overlap with each other by the light beams of the light source 40B acting on the projection source 50B. Accordingly, two adjacent test patterns 21B are spacedly arranged with other to from the 3D test chart. Referring to FIG. 12 of the drawings, the light source 40B and the projection source 50B can be provided at a lateral side of the predetermined space, and the projection source 50B can be provided at a position between the light source 40B and the predetermined space, so that the light beams produced by the light source 40B can project the information of the projection source 50B to the predetermined space for forming the plurality of test patterns 21B of the 3D test chart 100B.

In this embodiment, when employing the testing device to test the photographic arrangement 10, each test pattern 21B of the 3D test chart 100B is formed in the predetermined space while air may serve as a media, so that the influence of the index of the refraction on the testing result is reduced as much as possible, so as to ensure the testing precision. In addition, the 3D test chart 100B formed by the projection method is still advantageous that the volume of the 3D test chart 100B can be further reduced.

Figure 13:
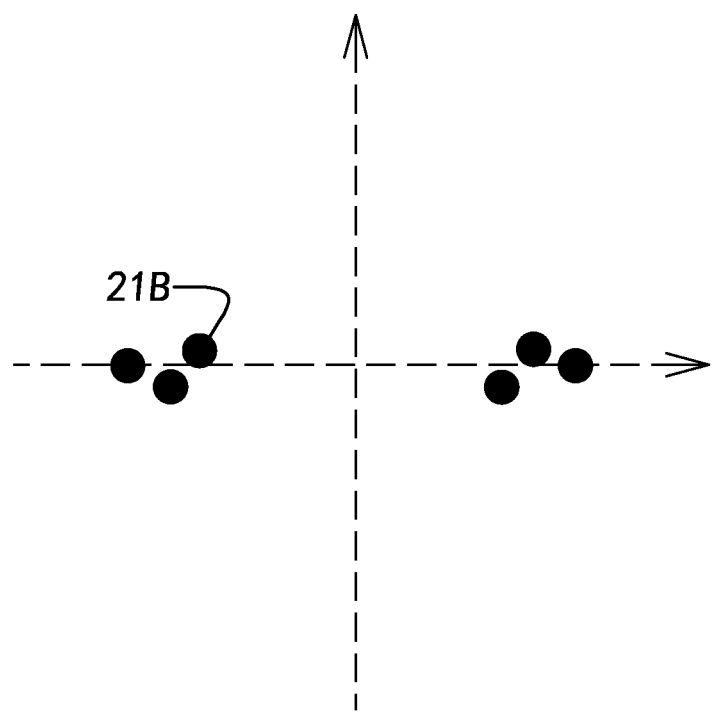
Figure 14:
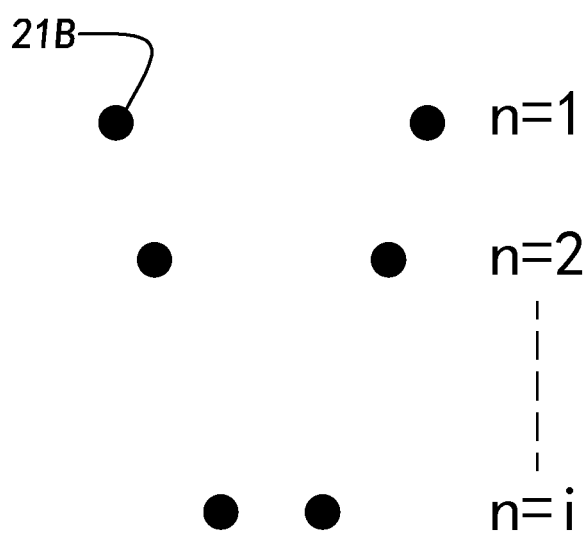

FIGS. 13 and 14 are respectively top view and side view of the 3D test chart 100B of this preferred embodiment, a person of ordinary skilled in the art can easily understand the configuration of the test patterns 21B of this embodiment.

Figure 15:
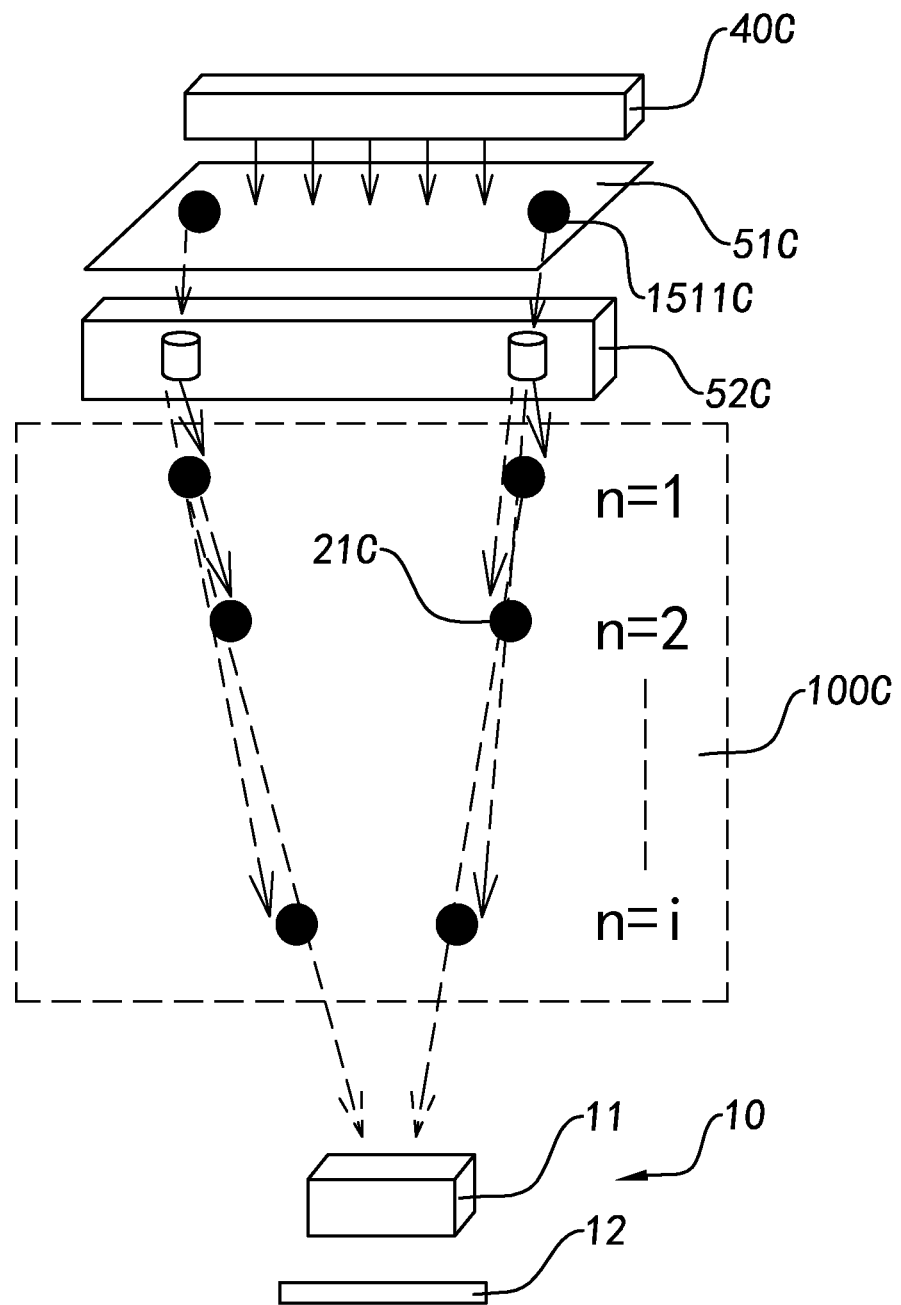
FIGS. 15, 16, and 17 are schematic views illustrating the 3D test chart according to a fourth preferred embodiment of the present invention.
Figure 16:
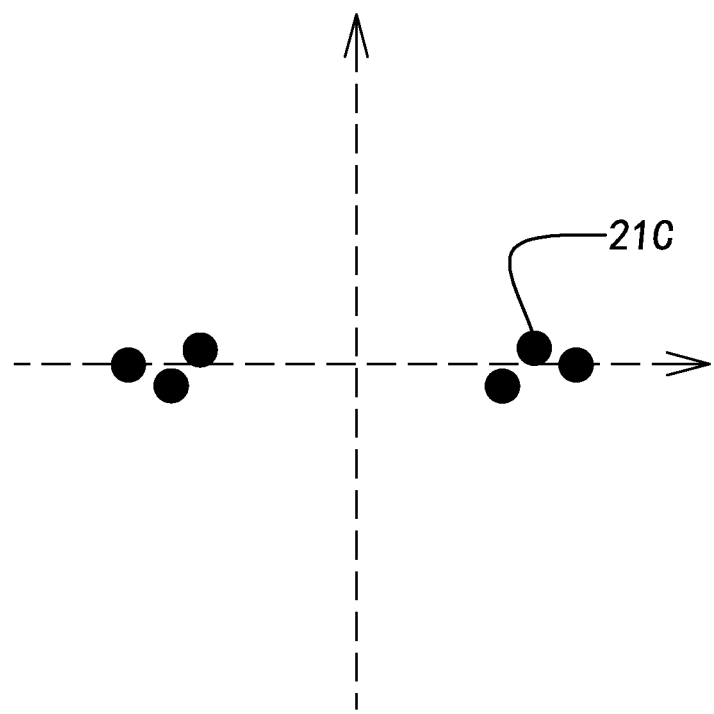
Figure 17:
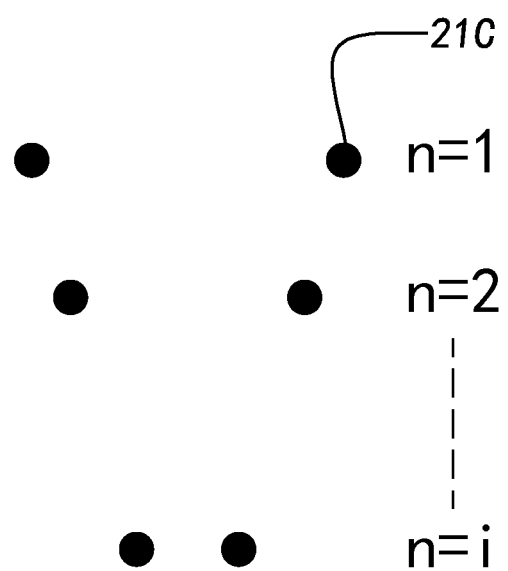

FIGS. 15, 16 and 17 are schematic views illustrating the testing process of the photographic arrangement 10 employing a focus zooming method. Similarly, the 3D test chart 100C comprises a light source 40C and a projection source 50C which is provided at a light path of the light source 40C. In other words, the light beams reach to the projection source 50C and then project out to form scenes of different depths in a predetermined space for facilitating the subsequent testing process of the photographic arrangement 10C.

As an example, referring to FIG. 15 of the drawings, the light source 40C and the projection source 50C are provided above the reserved space for forming the 3D test chart 100C in such a manner that the projection source 50C is provided between the reserved space and the light source 40C, so that the light beams of the light source 40C can project the information of the light source 50C to the reserved space to form the plurality of test patterns 21C of the 3D test chart 100C.

Furthermore, the projection source 50C comprises a planar test chart 51C and a focus zooming lens set 52C. Accordingly, the planar test chart 51C, which is provided between the light source 40C and the focus zooming lens set 52C, includes at least one test object 511C, so that the light beams of the light sources 40C reach to the test object 511C and form the 3D test chart 100C by means of the focus zooming lens set 52C. It is worth mentioning that the size, position and the quantity of the test object 511C can be adjusted according to different requirements of the 3D test chart 100C.

FIGS. 16 and 17 are respectively top view and side view of the 3D test chart 100C of this preferred embodiment, a person of ordinary skilled in the art can easily understand the configuration of the test patterns 21C of this embodiment.

Figure 18:
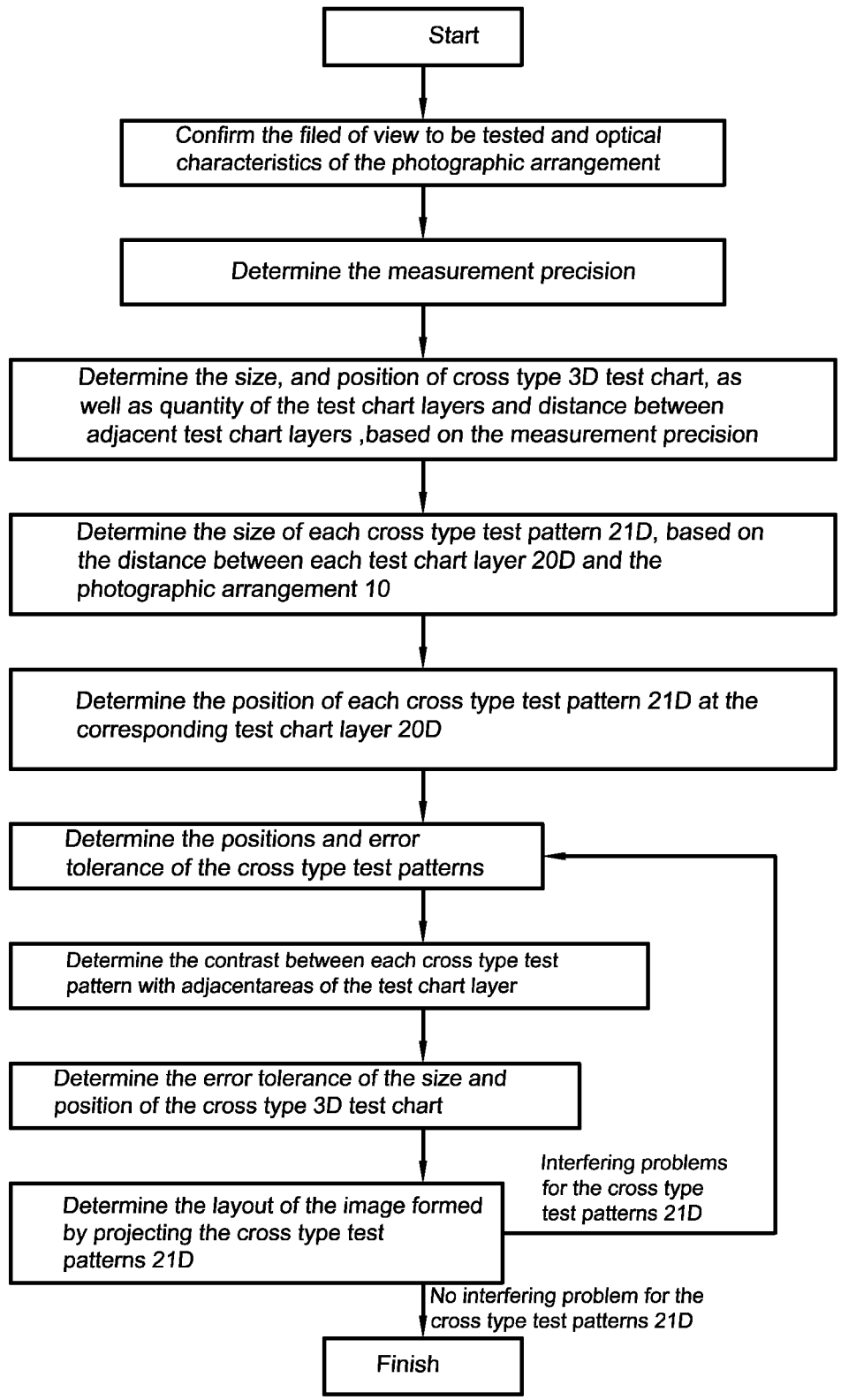
FIG. 18 is a flow chart illustrating the process for designing the 3D test chart which is embodied as a cross type 3D test chart of the present invention.

Referring to FIG. 18 of the drawings, a specific example of the 3D test chart 100D of the present invention is illustrated. Accordingly, the test pattern 21D of the 3D test chart 100D is embodied as a cross type test pattern 21D, so as to form a cross type 3D test chart. More specifically, the cross type 3D test chart comprises a plurality of test chart layers 30D arranged in a direction along a depth thereof. Each test chart layer 30D includes at least a predetermined area which is provided with one or more cross type test pattern 21D, so that the 3D test chart 100D allows a better testing result for testing the photographic arrangement 10.

Furthermore, the cross type test pattern 21D of each test chart layer 20D does not overlap with test patterns 21D of other test chart layers 20D in the direction along the depth thereof, so that when each cross type test pattern 21D is projected to the image space to form an image, they will not interfere with each other in the image, so that the testing precision of the photographic arrangement 10 is ensured because no noise is created when analyzing the imaging resolution of the photographic arrangement based on the image.

Figure 20:
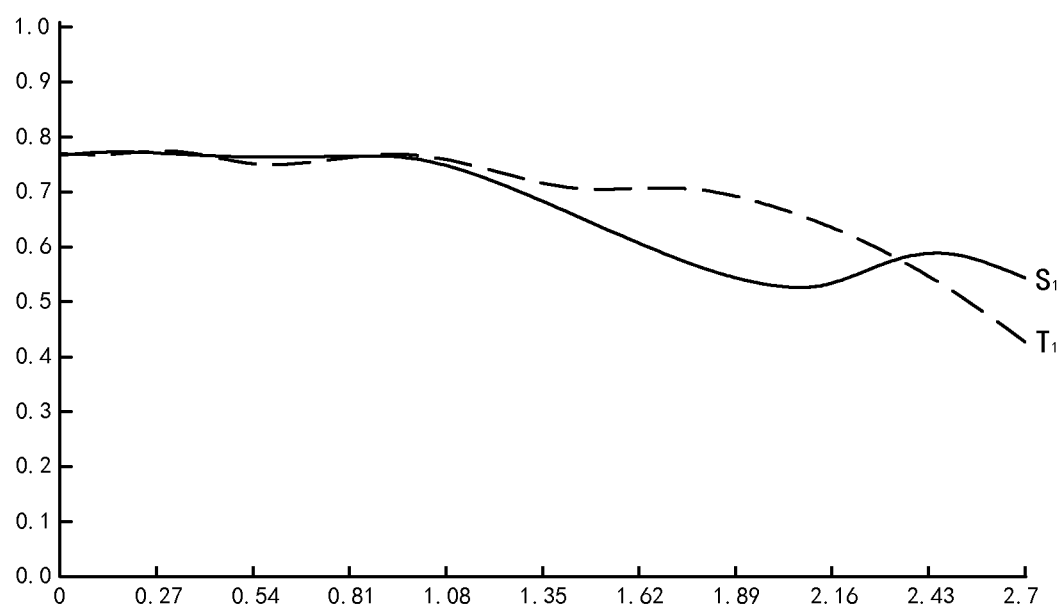
FIG. 20 is a schematic view illustrating the relationship between the image view span and image resolution of the photographic arrangement of the present invention.

Generally speaking, as shown in FIG. 20, the value of the imaging resolution decreases when the span of the testing field of view of the photographic arrangement 10 increases. This characteristic of the photographic arrangement requires that the sample range should be as small as possible when analyzing the imaging resolution, so that the testing precision can be controlled. However, the person of ordinary skilled in the art should understand that although the above solution can bring down the error of the imaging resolution of the photographic arrangement 10 when the span of the testing field of view is relatively large, the possibility for the test patterns interfering with each other in the image may increase, so that when designing each test pattern of the cross type 3D test chart, suitable test patterns should be selected to decrease the risk of interfering of different patterns in the image as well as the error resulting from the relatively large testing field of view at the same time.

Figure 21:
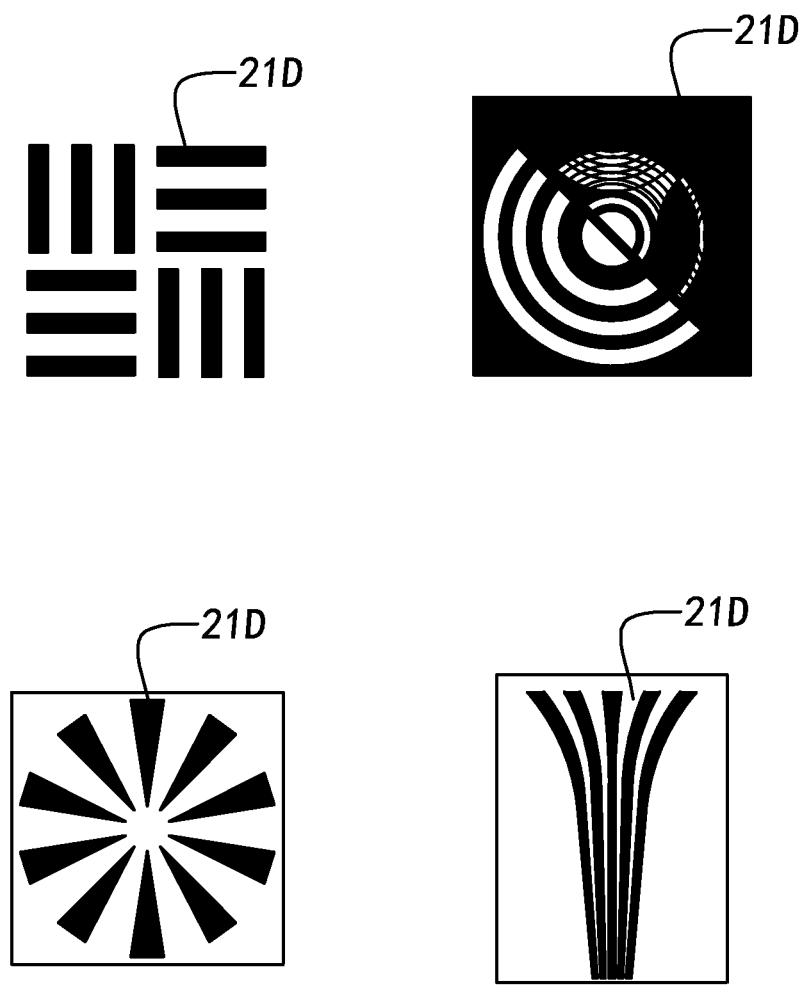
FIG. 21 is a schematic view illustrating the suitable shapes of the test patterns of the present invention.

As shown in FIG. 21 of the drawings, several possible patterns for the test patterns are illustrated. The person of ordinary skilled in the art should understand that the test patterns shown in the drawings are exemplary only and do not limit the present invention.

According to this preferred embodiment of the present invention, in order to prevent the interfering issue and guarantee that the test patterns 21D can occupy as many pixels as possible in the image, the shape of the test pattern 21D can be selected to cross type (i.e. "+") test pattern 21D or "−" type test pattern 21D when the size of the test pattern is predetermined. In other words, in order to ensure the density of the test patterns in the predetermined areas, the cross type or "−" type test patterns 21D will not interfere with each other when appearing in the image, so that it is possible for the subsequent analyzing step of the imaging resolution of the photographic arrangement 10. In addition, the cross type or "−" type test patterns 21D allows the 3D test chart to configure more patterns in a limited area, so that the types of the combined patterns can be enriched.

In addition, the cross type or "−" type test patterns 21D can avoid the noise when analyzing the imaging resolution of the photographic arrangement 10 with the 3D test chart. However, it is preferred to configure the test patterns to form shapes both in the meridian and sagittal directions in the image. In other words, when the 3D test chart is employed for analyzing the imaging resolution of the photographic arrangement 10, it is preferred that the projection shapes of the test patterns appear in the image extend along both in meridian and sagittal directions. Since the "–" type test patterns 21D only extend in one direction, it is preferred to choose the cross type test patterns 21D which may extend both in meridian and sagittal directions, so as to meet the testing requirements of the photographic arrangement 10. Therefore, it is possible for configuring more cross type test patterns 21D in a relatively limited area, so that the image formed from shooting the cross type 3D test chart by the photographic arrangement 10 is able to provide more information regarding the imaging resolution of the photographic arrangement 10.

The following disclosure will describe the design and forming method of the cross type 3D test chart, so that the person of ordinary skilled in the art can understand the present invention more clearly. It is appreciate that other details of the embodiment may be technical skills well known in this field and may be omitted in the description of the present invention.

As an example, FIG. 18 illustrates a procedure for designing the cross type test chart of the present invention. More specifically, the parameters regarding the position configuration of the cross type 3D test chart, the layout of the cross type test patterns 21D can be determined by the type of the photographic arrangement 10. In other words, when the type of the photographic arrangement 10 is determined, the related parameters of the photographic arrangement 10 can be measured to calculate the parameters of the cross type 3D test chart. It is worth mentioning that the parameters of the photographic arrangement include but not limited to the testing field of view, the focal length, the testing distance, and the precision requirement for fitting the back focus.

In the following description, the process for calculating the size and number of the layers of the cross type test chart layers after measuring the parameters of the photographic arrangement 10 is illustrated in details.

More specifically, set F as the parameter which represents the testing field of view, set EFL as the parameter which represents the focal length of the photographic arrangement 10, and set a as the parameter which represents the precision requirement for fitting the back focus of the photographic arrangement 10. Accordingly, the parameter a reflecting the precision requirement for fitting the back focus is determined by the actual fitting requirement which depends on the processing requirement of the software. Furthermore, set Z as the parameter which represents the testing distance of the cross type 3D test chart 100D, and $Z_j$ represents the testing distance of the jth layer of the test chart layers 20D, the range of the values of j is that j>=2, while $Z_j$ represents the testing distance of the first layer of the test chart layers 20D which is the test patter layer 20D of the 3D test chart farthest from the photographic module 11, meanwhile, $Z_1$ is determined when the type of the photographic arrangement 10 is selected. In other words, when the type of the photographic arrangement 10 to be tested is determined, the testing distance of the first layer of the test chart layers 20 is determined at the same time. Furthermore, when the related parameters of the photographic arrangement 10 are obtained, the parameters are used to calculate the position of the cross type 3D test chart and the number of the layers of the test chart layers 20D.

More specifically, set h as the parameter which represent the position of the cross type 3D test chart 100D, then $h_j$ represents the position of the jth layer of the test chart layers 20D, and similarly the range of the values of j is that j>=2, the functional equation reflecting the position of the test chart layers is that a=–((EFL*(–hj)/(EFL–hj)–(EFL*(–h)/(EFL–h))).

Accordingly, based on the above functional equation, the value of $h_j$ can be calculated to determine the position of each test chart layer 20D of the 3D test chart 100D.

Furthermore, set n as the parameter which represents the number of the layers of the test chart layers 20D, set t as the parameter which represents the error tolerance of the photographic arrangement 10 which is predetermined by the manufacturing process, accordingly, the parameter t contains but not limited to error tolerances of the height, the tilt, and the shift of the photographic arrangement 10. In addition, set s as the parameter which represents the number of the moving steps of the photographic arrangement 10. It is worth mentioning that in some examples, the range of the values of the number of the moving steps of the photographic arrangement 10 can be that s>=1. In other words, only one single moving step may be required to move the photographic arrangement 10 for obtaining the corresponding data. Accordingly, the functional equation regarding the number of the layers of the test pattern payers 20D can be as follows: n=f(t, a, s). Thus, the value of the parameter of n can be calculated based on the above formula to calculate the number of the required test chart layers 20D. In addition, in other possible examples, the photographic arrangement 10 may not require moving before obtaining the data.

Accordingly, after determining the position of the cross type 3D test chart and the number of the layers of the test chart layers, the shape, position and size of each test pattern 21D can be determined in the following step As an example, referring to FIG. 22 of the drawings, set d as the parameter which represents the layout of the cross type test patterns 21D of the cross type 3D test chart 100D. More specifically, the parameter d of the test patterns 21D represents the density of the test patterns 21. Accordingly, set $d_{ij}$ as a parameter which represents a distance from a cross type test pattern 21 of a test chart layer 20 to a center of the test chart layer 20, wherein i represents the position of the cross type test pattern 21 which is located at the test chart layer 20, j represents the number of the test chart layer, so that $d_{ij}$ represents the layout of the ith cross type test pattern 21 of the jth test chart layer 20, and the functional equation representing the layout of the test patterns is as follows: $d_{ij}$=f(F, $h_{ij}$, EFL). It is worth mentioning that the testing field of view F is determined by the photographic arrangement 10 to be tested, $h_{ij}$ can be obtained by the above functional equation reflecting the position configuration of the 3D test chart. Therefore, the above functional formula can be used to calculate the value of $d_{ij}$, and thus the layout of the test patterns 21 can be determined. In other words, the density of the test patterns 21 of each test chart layer 20 can be obtained based on the above functional formula. It is worth mentioning that the density of the cross type test patterns 21D of the test chart layers 20D can be the same, or also can be different.

Figure 22:
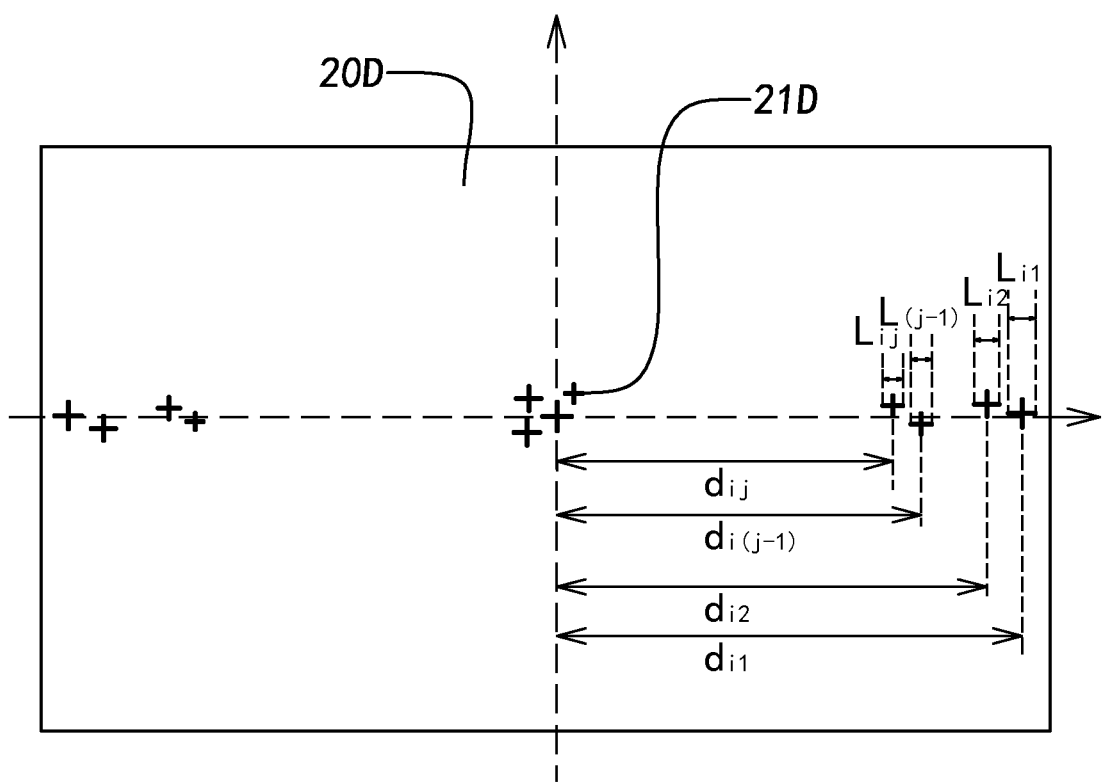
FIG. 22 is a schematic view illustrating the layout of the cross type test patterns of the test chart layers according to the above preferred embodiment of the present invention.

Furthermore, referring to FIG. 22, set L as the parameter which represents the size of each cross type test pattern 21D. Accordingly, $L_{ij}$ can be the parameter which represents the size of one of the test patterns 21D, i.e. $L_{ij}$ is the parameter representing the size of the ith cross type test pattern 21D of the jth test chart layer 20D. Accordingly, $d_{ij}$ is the parameter which represents the distance from a cross type test pattern 21D of a test chart layer 20D to a center of the test chart layer 20D. Furthermore, set ΔF as the parameter which represents the allowable range of the span of testing field of view, set t' as the parameter which represents the error tolerance for manufacturing the cross type 3D test chart 100D, set n' as the parameter which represents the index of refraction of the cross type 3D test chart 100D, set s' as the parameter which represents the allowable disc of confusion during a calculating step of a software, and a functional equation regarding the size of the cross type test pattern 21D is as follows: $L_{ij}=f''(d_{ij}, \Delta F, t', n', s')$. Accordingly, the size of each cross type test pattern 21D can be obtained by calculating the value of $L_{ij}$ based on the above mentioned functional equation.

It is worth mentioning that the process for calculating the size $L_{ij}$ of the cross type test pattern 21D is a procedure for balancing each parameter of the cross type 3D test chart with the error tolerance for manufacturing the cross type 3D test chart 100, and when the size $L_{ij}$ of the cross type test pattern 21D is determined, the error tolerance for manufacturing the cross type 3D test chart 100D is determined. It is still worth mentioning that when the parameters of the cross type 3D test chart are determined, the cross type 3D test chart can be manufactured based on these parameters.

It is still worth mentioning that since the types of the photographic arrangements 10 can be different, the focal length, the bore diameter, the area range of the image, the size of the imaging unit of the image sensor 12 of different types of the photographic arrangement 10 are varied from each other. In addition, the precision requirement for testing the photographic arrangement 10 as well as the distance from the cross type 3D test chart to the photographic arrangement 10 is considered to calculate the parameters of the cross type 3D test chart.

Furthermore, according to an embodiment of the present invention, the size of the shape of each cross type test pattern 21D in the image should be the same. For example, when the shape of each cross type test pattern 21D appears in the image, the width and length of the shape of each cross type test pattern 21D is required to be concurrent, and then the person of ordinary skilled in the art should understand the width and length of each cross type test pattern 21D of the cross type 3D test chart in the predetermined space should be varied from each other.

In addition, according to an embodiment of the present invention, in order to ensure that each cross type test pattern 21D can be projected to the designated viewing area in the image, the location for the image element formed corresponding to each cross type test pattern 21D in the viewing area of the image is designated, and then a back projection method is used to determine the position of each cross type test pattern 21D, so that the position and size of each cross type test pattern 21D of the test chart layer 20D of the cross type 3D test chart can be quickly obtained.

After determining the position and size of each cross type test pattern 21D, it is required to analyze the error when the image element corresponding to each cross type test pattern 21D appears in the image. For example, the material of the test chart layer 20D may cause the image elements of the cross type test patterns 21D in the image to be not concurrent and not to be appear at right positions. The contrast between the cross type test pattern and the corresponding test chart layer should be determined based on the above mentioned reason and extent of the error when each cross type test pattern is projected to the image.

Figure 19:
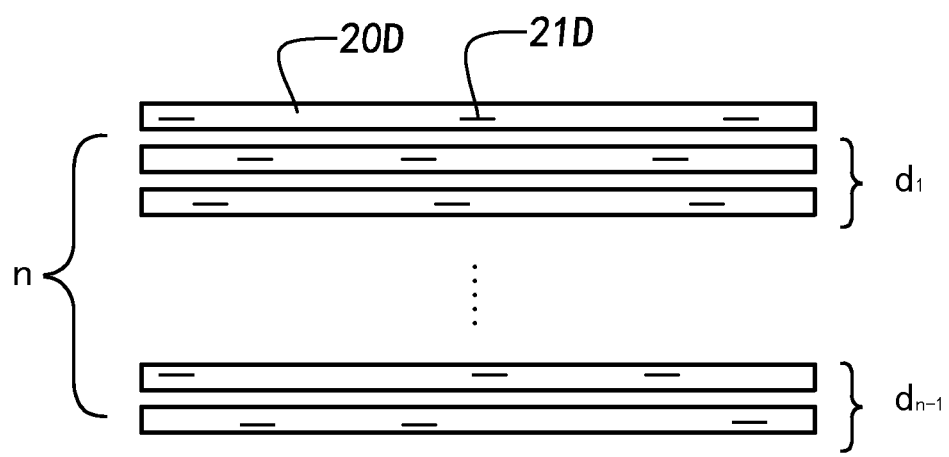
FIG. 19 is a side view of the 3D test chart of the present invention.

It is worth mentioning that the media for forming each test chart layer 20D can be tangible material, or the cross type test patterns can be directly provided in the air. More specifically, as shown in FIG. 19, tangible material, such as organic or inorganic glass, transparent display screen, and material with a high index of reflection, can be used to form the cross type 3D test chart, so as to guarantee the contrast between the cross type test patterns and the tangible material of the test chart layers. When a projection method is employed, the test patterns can be formed in a predetermined space by means of the projection method. Suitable projection arrangement such as the devices similar to the projection source 50B and 50C can be employed, and the present invention are not limited by the above mentioned examples.

It is still worth mentioning that when the design of the cross type 3D test chart is accomplished, it is required to test and analyze the application of the cross type 3D test chart. Accordingly, when the image formed by means of the cross type test patterns 21D meets the requirements, and there are no overlapping and interfering problems, then the job of the design of the cross type 3D test chart is finished. When there are interfering problems for the image formed by means of the cross type test patterns 21D, the error tolerance should be calculated again to reset the layout such as the size and density of the cross type test patterns 21D.

Correspondingly, the present invention further provides a method for forming the cross type 3D test chart, wherein the method comprises the step of forming a plurality of cross type test patterns 21 in a direction along a depth thereof which do not overlap when they are projected to an image space to form an image.

Preferably, the method further comprises the step of collecting the parameters and precision requirements of the photographic arrangement 10 to be tested, and determining the position configuration of the cross type 3D test chart and the number of the layers of the test chart layers 20D.

More specifically, set a as the parameter which represents the precision requirement for fitting the back focus of the photographic arrangement 10 to be tested, set EFL as the parameter which represents the focal length, set h as the parameter which represent the position configuration of the cross type 3D test chart 100D, then $h_j$ represents the position of the jth layer of the test chart layers 20D, and the functional equation reflecting the position of the test chart layers is as follows: $a=-((EFL*(-h_j)/(EFL-h_j)-(EFL*(-h)/(EFL-h)))$. Accordingly, based on the above functional equation, the value of $h_j$ can be calculated to determine the position of each test chart layer 20D of the cross type 3D test chart 100D.

In addition, set n as the parameter which represents the number of the layers of the test chart layers 20D, set t as the parameter which represents the error tolerance of the photographic arrangement 10 which is predetermined by the manufacturing process, set s as the parameter which represents the number of the moving steps of the photographic arrangement 10, and then obtain the functional equation regarding the number of the layers of the test pattern payers 20D as follows: $n=f(t, a, s)$. Therefore, the quantity of the test chart layers 20D can be determined by obtaining the value of n.

Preferably, in the above method, when the position configuration of the cross type 3D test chart and the quantity of the test chart layers 20D are determined, the error tolerance of the material of the test chart layers 20D as well as other error tolerances may be considered to determine the layout of the cross type test patterns 21D.

According to an embodiment of the present invention, set d as the parameter which represents the layout of the cross type test patterns 21D, and $d_{ij}$ is a parameter which represents a distance from a cross type test pattern 21D of a test chart layer 20D to a center of the test chart layer 20D, set F as the parameter which represents the testing field of view of the photographic arrangement 10, and obtain the functional equation representing the layout of the test patterns as follows: $d_{ij}$=f'(F, $h_{ij}$, EFL). Thus, the value of the parameter $d_{ij}$ can be respectively calculated based on the above formula to obtain the layout of the cross type test patterns 21D.

Furthermore, set L as the parameter which represents the size of each cross type test pattern 21D and $L_{ij}$ can be the parameter representing the size of the ith cross type test pattern 21D of the jth test chart layer 20D, set t' as the parameter which represents the error tolerance for manufacturing the cross type 3D test chart 100D, set n' as the parameter which represents the index of refraction of the cross type 3D test chart 100D, set s' as the parameter which represents the allowable disc of confusion during a calculating step of a software, set ΔF as the parameter which represents the allowable range of the span of testing field of view, and then obtain a functional equation regarding the size of the cross type test pattern 21D as follows: $L_{ij}$=f''(dij, ΔF, t', n', s'). Accordingly, the size of each cross type test pattern 21D can be obtained by calculating the value of $L_{ij}$ based on the above functional equation.

According to another preferred embodiment of the present invention, when designing the layout of the cross type test patterns 21A, a cross type image may be formed at first, and then uses a back projection method to obtain the configuration of the cross type 3D test chart, so that the cross type 3D test chart provide a plurality of test patterns extending along different depths.

It is worth mentioning that during determining the parameters of the cross type test chart, at least one predetermined position can be determined at each test chart layer 20D, and at least one test pattern 21D is provided at the predetermined position. And then, a plurality of test chart layers 20D are overlapped in such a manner that each cross type test pattern 21D of a test chart layer 20D does not overlap with cross type test patterns 21D of other test chart layers 20D, so that there is no interfering problem in the image formed by means of the projection of the 3D test chart.

According to an embodiment of the present invention, each cross type test pattern 21D can be formed on a surface of the corresponding test chart layer 20D. For example, each cross type test pattern 31D can be prepared and then is attached to the surface of the corresponding test chart layer 20D, and the plurality of test chart layers 20D are overlapped to form the cross type 3D test chart. According to another example of the present invention, each cross type test pattern 21D can be formed in the corresponding test chart layer 30D, so that the reliability of the cross type 3D test chart for testing the photographic arrangement 10 is ensured.

Figure 23:
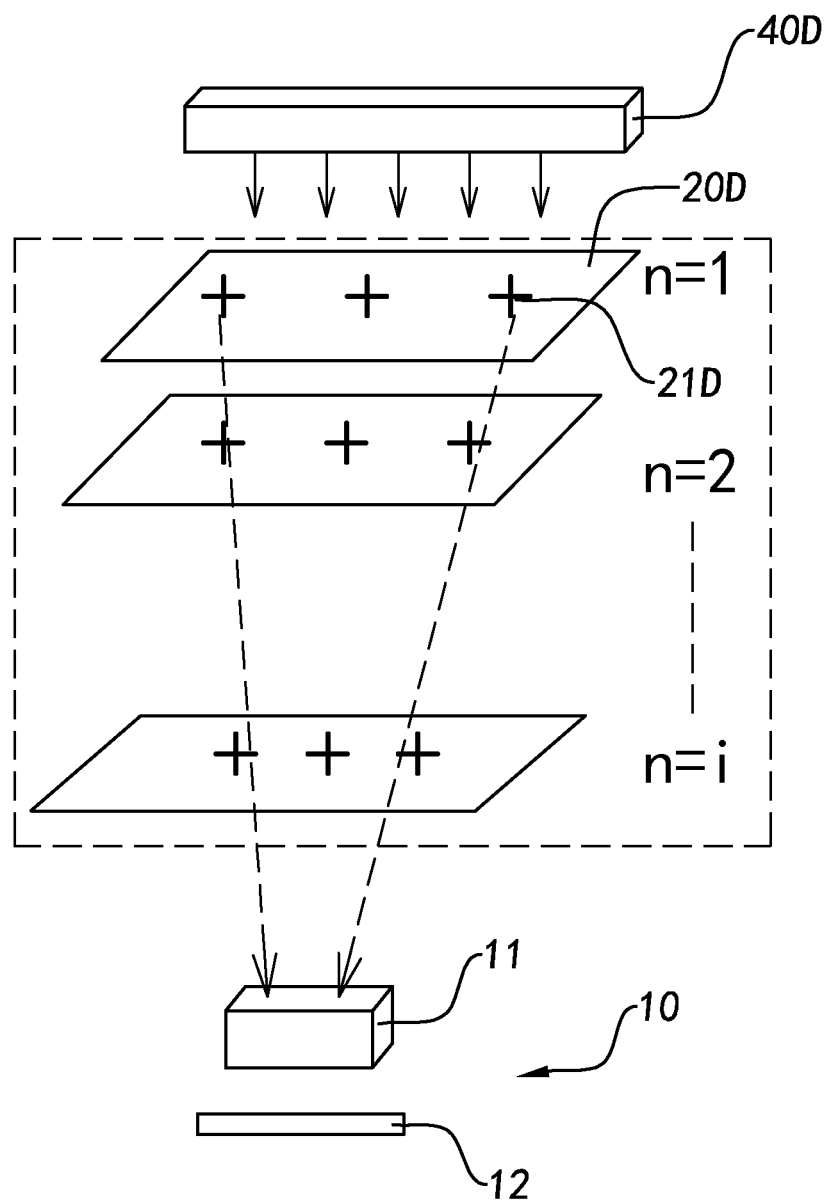
FIG. 23 is a schematic view illustrating a first example of the cross type 3D test chart according to the above preferred embodiment of the present invention.
Figure 24:
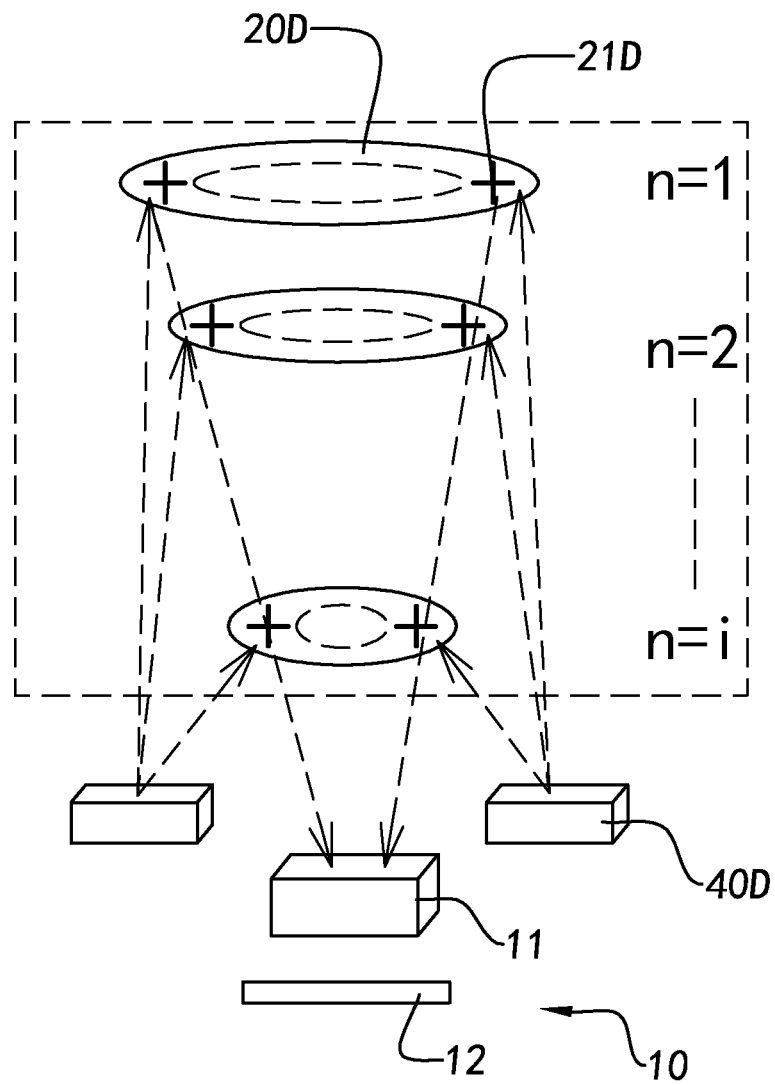
FIG. 24 is a schematic view illustrating a second example of the cross type 3D test chart according to the above preferred embodiment of the present invention.

Referring to FIGS. 23 and 24 of the drawings, when the cross type 3D test chart is used for testing the photographic arrangement 10, a light source 40D may be employed to enhance the contrast between the cross type test patterns 21D and the corresponding test chart layers 20D, so that the information of each cross type test pattern 21D can be easy to be captured by the photographic arrangement 10.

More specifically, as a first example, referring to FIG. 23 of the drawings, the light source 40D is provided at a position to configure the cross type 3D test chart to be arranged between the light source 40D and the photographic arrangement 10, so that light beams of the light source 40D pass through the test chart layers 20D to enhance the contrast between each cross type test pattern 21D and corresponding test chart layer 20D, so that each test pattern 21D can be easily identified and captured by the photographic module 11.

As a second example, referring to FIG. 24 of the drawings, the light source 40D and the photographic arrangement 10 can be arranged at the same side of the cross type 3D test chart. Accordingly, one or more light sources 40D can be provided to produce evenly projecting light beams which pass through the test chart layers 20D and also enhance the contrast between each cross type test pattern 21D and the corresponding test chart layer 20D. In comparison with the transmissive 3D test chart of the above first example, the difference of the 3D test chart of this second example is that it is a reflective test chart for testing the photographic arrangement 10.

Figure 25:
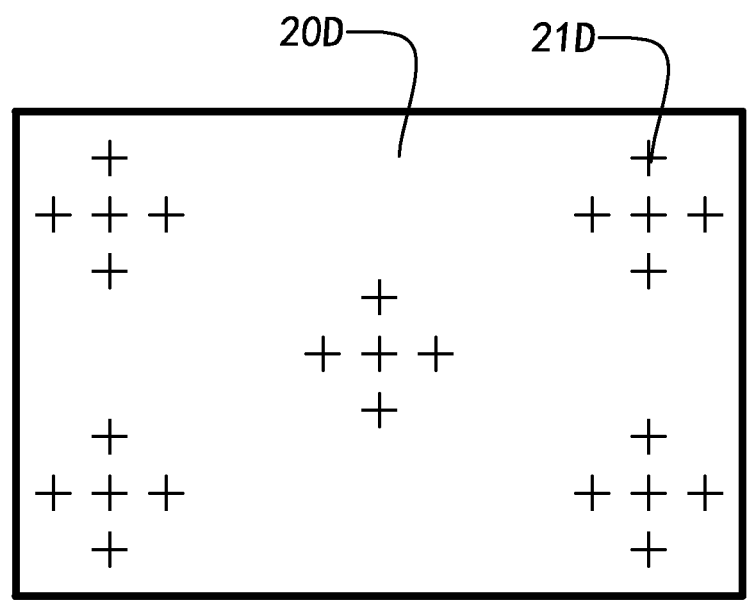
FIG. 25 is a schematic view illustrating the image pattern formed in the image space which is projected by the second example of the cross type 3D test chart which is in the object space according to the above preferred embodiment of the present invention.

FIG. 25 illustrates the image formed by projecting each test pattern 21D into the image space when testing the photographic arrangement 10, the lengths and widths of the lines of the cross type test patterns 21D of the cross type 3D test chart in the predetermined space may be different, so that the lengths and widths of the image elements formed by means of the cross type test patterns 21D may be the same, so that it is convenient for analyzing the imaging resolution of the photographic arrangement 10.

Figure 26:
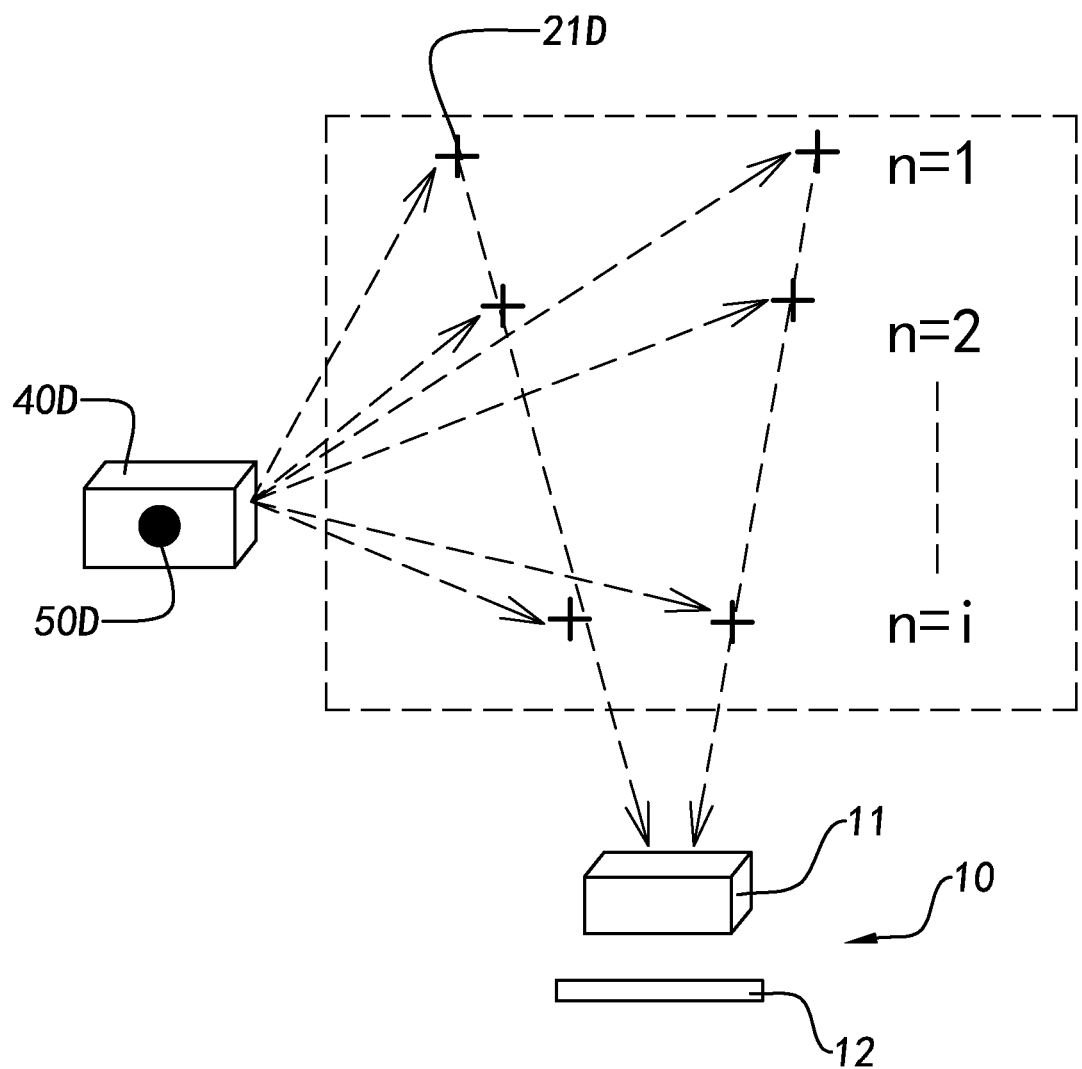
FIG. 26 is a schematic view illustrating a third example of the cross type 3D test chart according to the above preferred embodiment of the present invention.
Figure 27:
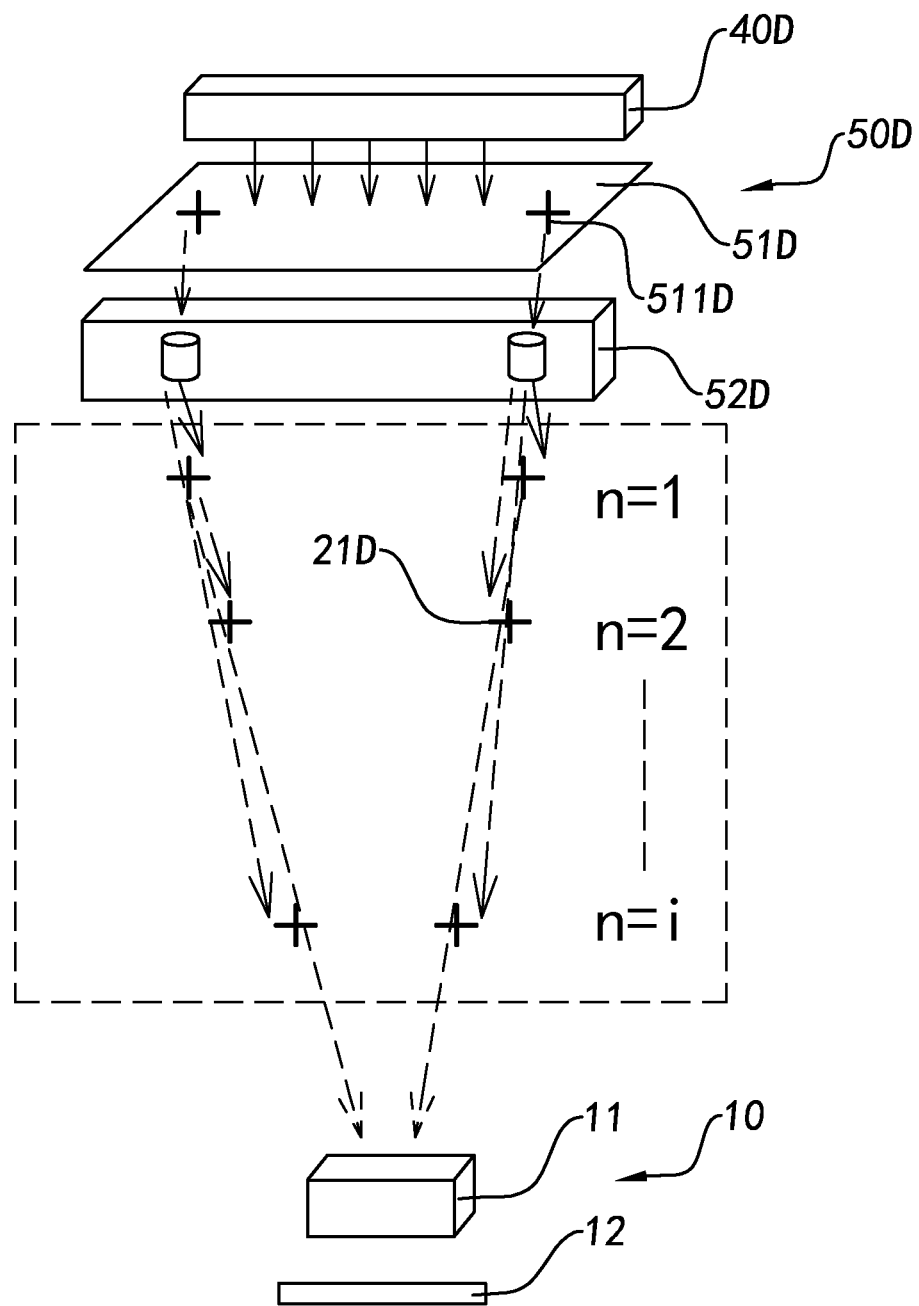
FIG. 27 is a schematic view illustrating a fourth example of the cross type 3D test chart according to the above preferred embodiment of the present invention.

Referring to FIGS. 26 and 27 of the drawings, a projection method can be used to provide the plurality of test patterns 21D in different spaces.

More specifically, referring to FIG. 26 of the drawings, a projection source 50D is provided at a light path of the light source 40D. In other words, the light beams reach to the projection source 50D and then project out to form a plurality of cross type test patterns 21D which do not overlap with each other by the light beams of the light source 40D acting on the projection source 50D. Accordingly, two adjacent cross type test patterns 21D are spacedly arranged with other to from the cross type 3D test chart, so that there is no interfering problem in the image. In addition, the light source 40D and the projection source 50D can be provided at a lateral side of the predetermined space, and the projection source 50D can be provided at a position between the light source 40D and the predetermined space, so that the light beams produced by the light source 40D can project the information of the projection source 50D to the predetermined space for forming the plurality of cross type test patterns 21D of the 3D test chart 100D.

Referring to FIG. 27 of the drawings, the light source 40D and the projection source 50D are provided above the reserved space for forming the 3D test chart 100D. Furthermore, the projection source 50D comprises a planar test chart 51D and a focus zooming lens set 52D. Accordingly, the planar test chart 51D, which is provided between the light source 40D and the focus zooming lens set 52D, includes at least one cross type test object 511D, so that the light beams of the light sources 40D reach to the cross type test object 511D and form the cross type 3D test chart 100D by means of the focus zooming lens set 52D.

It is worth mentioning that the person of ordinary skilled in the art should understand that the cross type 3D test chart can be prepared by other methods, and the above cross type 3D test charts are exemplary only and do not limit the present invention.

In addition, when testing the photographic arrangement 10 using the cross type 3D test chart, the testing method regarding the imaging quality can be any method, which can evaluate the imaging resolution of the photographic arrangement 10, can be selected from the group consisting of OTF (Optical Transfer Function), MTF (Modulation Transfer Function), SFR (Spatial Frequency Response), CTF (Contrast Transfer Function) and the combination thereof. Preferably, the MTF (Modulation Transfer Function) method can be used. The person of ordinary skilled in the art should understand that other methods also can be used to evaluate and test the imaging quality of the photographic arrangement 10.

It is still worth mentioning that although the photographic arrangement 10 described in the specification is illustrated to comprises the photographic module 11 and the image sensor 12, the photographic module 11 may comprises one or more lens, and optionally a voice coil motor (not shown in the drawings), the image sensor 12 may be provided with a PCB board (not shown in the drawings). In other words, other possible components may be provided for facilitating the operation of the photographic module 11 and the image sensor 12.

Referring to FIGS. 28 to 35 of the drawings, a testing method, an adjusting method, and an adjusting arrangement corresponding to the adjusting method according to a preferred embodiment of the present invention are illustrated. The testing method of the present invention tests parameters such as the focal points and the tilt of the photographic module 11 and the image sensor 12. Accordingly, the positions of the photographic arrangement 10 and the image sensor 12, as well as the relative position therebetween are adjusted in the subsequent adjusting process, so that the photographic arrangement 10 and the image sensor 12 are respectively adjusted to suitable positions, sot that the high imaging quality of the photographic arrangement is ensured.

Figure 36:
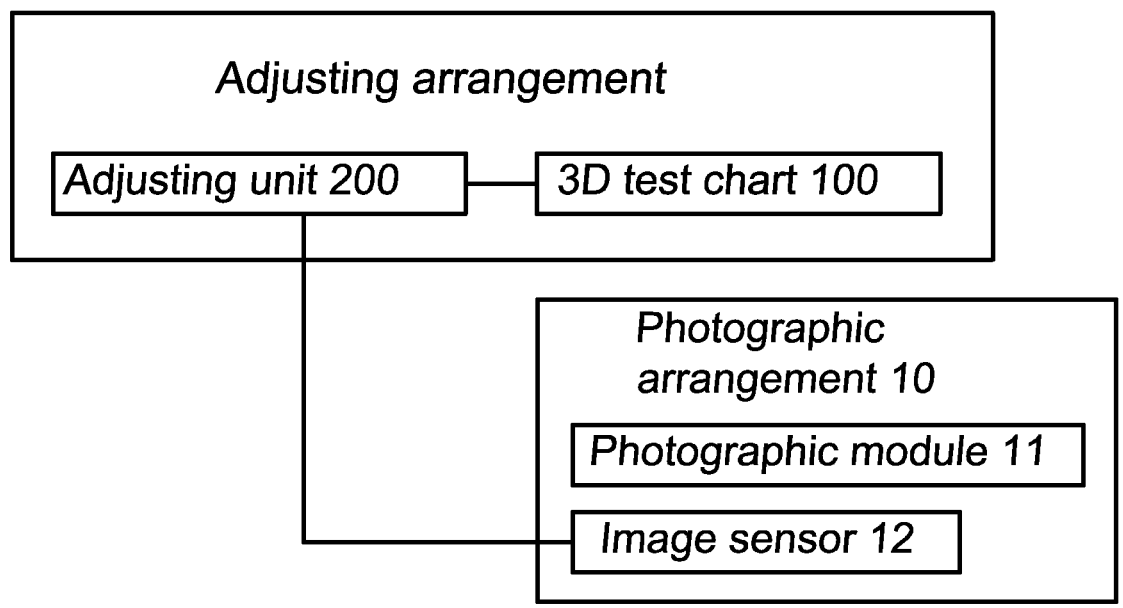
FIG. 36 is a block diagram illustrating the adjusting arrangement of the present invention.

Referring to FIG. 36 of the drawings, the adjusting arrangement comprises a 3D test chart 100, an adjusting unit 200 and other possible components such as the light source. Accordingly, the 3D test chart 100 comprises a plurality of test patterns 21 which provides scenes of various different depths, so that when testing the photographic arrangement 10, a single shooting action of the photographic arrangement 10 is able to provide an image with information of different depths. More specifically, the 3D test chart 100 comprises a plurality of test patterns 21 which do not overlap with each other and are arranged in a direction along a depth thereof, two adjacent test patterns 21 are spacedly arranged, so that when the photographic arrangement 10 is used to capture the information of the 3D test chart, an image with information of different depths can be obtained.

According to the present invention, before testing the photographic arrangement 10, it is a necessary step for establishing a plurality of test patterns 21 which are arranged in different depths. And then, an image with information of different depths can be obtained by shooting the test patterns 21 with the photographic arrangement 10. According to this preferred embodiment of the present invention, forming the 3D test chart of the present invention is able to provide test patterns 21 in different depths.

More specifically, the 3D test chart 100 comprises a plurality of test chart layers 20 which are arranged in a direction along a depth thereof, each test chart layer 20 is provided with at least one test pattern 21, and the test pattern 21 of one test chart layer 20 does not overlap with other test patterns 21 of other test chart layers 20 arranged in different depths.

After the parameters of the 3D test chart 100 are determined, the person of ordinary skilled in the art should understand the quantity of the test chart layers 20 of the 3D test chart 100 is n=j, wherein j>1. Each of the parameters $h_1$ to $h_{j-1}$ represents the pitch of each test chart layer (a distance between adjacent test chart layers). Each of the parameters from $U_1$ to $U_{j-1}$ represents the object distance of each test pattern 21, and each of the parameters from $V_1$ to $V_{j-1}$ represents the image distance of each test pattern 21. In other words, test patterns 21 of different test chart layers have different object distances and image distances. Set $m_i n_j$ as a parameter representing a serial number of the test pattern 21, wherein j represents the layer number of the test chart layer 20 while i represents the designated number of the test pattern 21, wherein i>1. In other words, two or more test patterns 21 can be provided at each test chart layer 20. Alternatively, each test chart layer 20 may also be provided with a single test pattern 21 in other examples. In addition, the image element corresponding to each test pattern 21 is designated as $m'_{ij}$.

Figure 31:
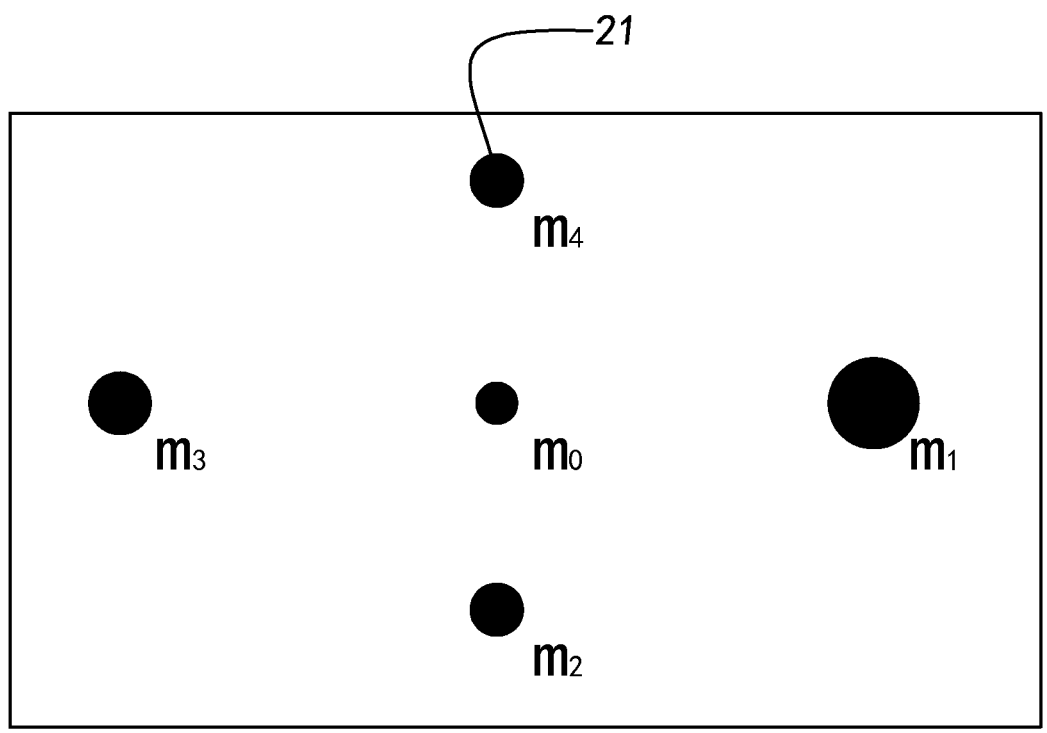
FIG. 31 is a diagram illustrating the images of the test patterns at different positions before the adjusting process of the photographic arrangement of the present invention.

Referring to FIG. 31 of the drawings, a configuration of the 3D test chart 100 according to a preferred embodiment of the present invention is illustrated, the shape of each test pattern 21 can be adjusted according to actual requirements. In the testing method, when the test patterns 21 of different depths of the 3D test chart 10 are shot by the photographic arrangement 11, the corresponding resolution values are obtained. Set $mtf_{(ij)}$ as the parameter representing the resolution value of each test pattern 21, set ω as the parameter representing the shape of each test pattern 21, set (h,d) as the parameter representing the position configuration of each test pattern 21, set s as the parameter representing the intensity of the light source, and then a functional equation regarding the resolution value of each test pattern 21 is as follows: $mtf_{(ij)}=f(\omega, h, d, s)$.

Figure 28:
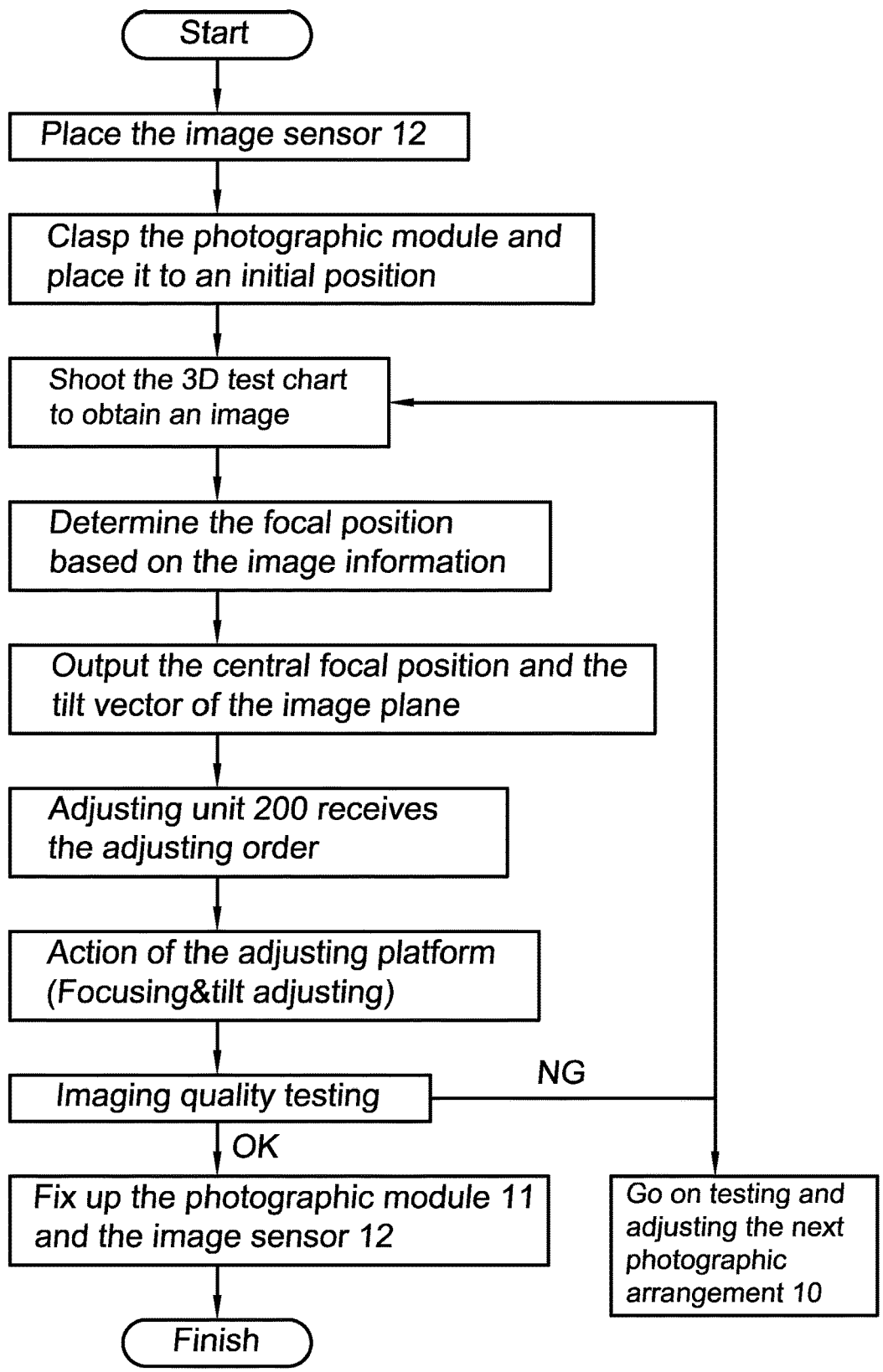
FIG. 28 is a flow chart illustrating a testing and adjusting process of the photographic arrangement of the present invention.
Figure 29:
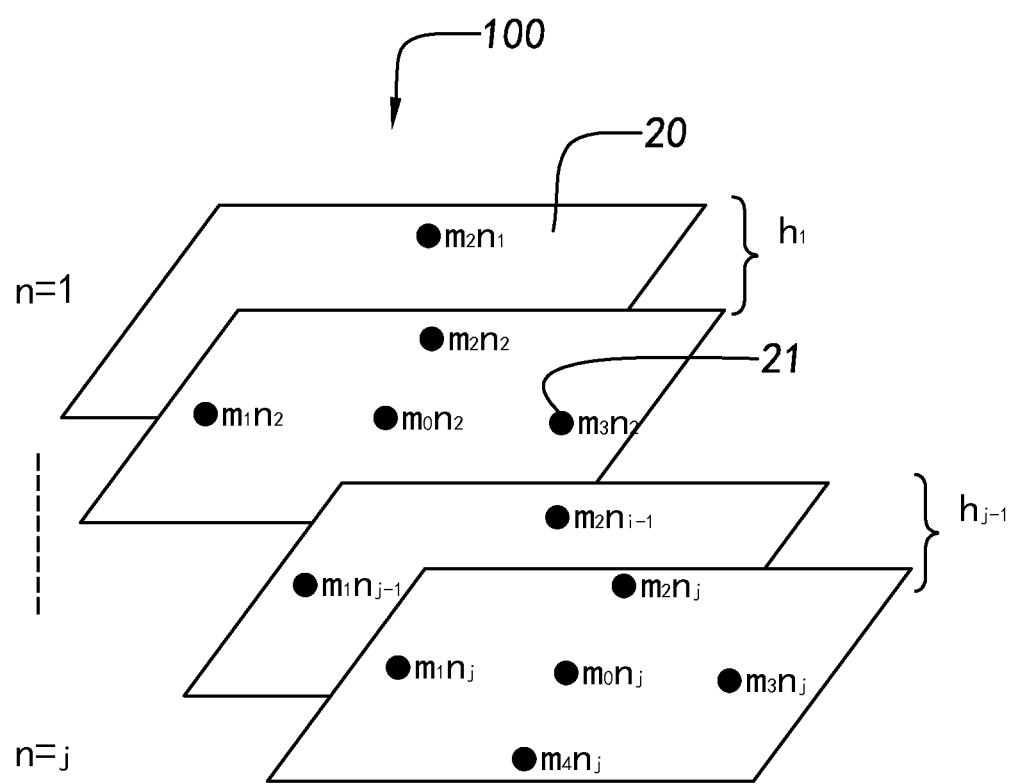
FIG. 29 is a schematic view illustrating the layout of the 3D test chart of the present invention.

Referring to FIG. 28, a flow chart illustrating the testing and adjusting process of the photographic arrangement 10 with scenes of different depths is shown. More specifically, when testing the photographic arrangement 10 with the testing method of the present invention, the photographic module 11 and the image sensor 12 are placed at initial positions, i.g. the image sensor 12 is placed at a predetermined position at the adjusting unit 200, and then the photographic module 11 can be clasped and delivered to a corresponding initial position so as to align the photographic module 11 with the image sensor 12, so that the photographic module 11 cooperates with the image sensor 12 to obtain images of the test patterns 21 of the 3D test chart 100.

Accordingly, the photographic arrangement 10 is placed at the initial position to shoot a picture about the test patterns 21. It is worth mentioning that the test patterns 21 of different depths of the 3D test chart will appear in the same image, so that a single image can provide information of the test patterns of different depths, and the corresponding resolution values corresponding to each test pattern 21 can be calculated out. The person of ordinary skilled in the art should understand that the different depths of the 3D test chart means different image distances can be provided. In other words, different image distances are respectively provided between the test patterns 21 of the 3D test chart 100 and the photographic arrangement 10, so that the image information can be used to provide a functional formula regarding the imaging resolution and defocus amount of each test pattern 21.

Accordingly, the functional equation regarding the imaging resolution and defocus amount of each test pattern 21 is as follows:

$$F_0=F_{(v)}\{mtf_{(01)}, mtf_{(02)}, mtf_{(03)} \ldots tmf_{(0j)}\},$$

$$F_j=F_{(v)}\{mtf_{(i1)}, mtf_{(i2)}, mtf_{(i3)} \ldots mtf_{(ij)}\}.$$

Set P as the parameter representing the focal point, and the person of ordinary skilled in the art is able to calculate out the focal points of the test patterns 21 as $P_0$ to $P_j$. $P_0$ represents the focal point of the center of test patterns 21 of the 3D test chart 100, and also $P_0$ is referred to the focusing position of the photographic arrangement 10.

Figure 30:
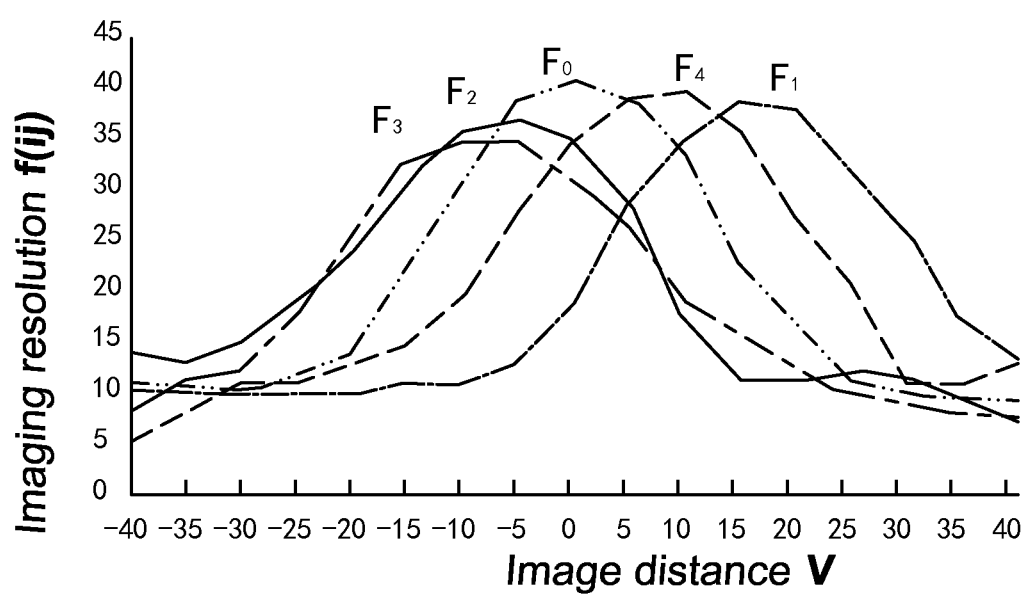
FIG. 30 is a diagram illustrating the relationship between the image resolution and image distance of test patterns at different positions before the adjusting process of the photographic arrangement of the present invention.

According to an embodiment of the present invention, after calculating out the focal point, curves $F_0$ to $F_4$ indicating the relationship between the imaging resolution and image distance are obtained, as shown in FIG. 30. Accordingly, curve $F_0$ represents the functional curve corresponding to the central field of view ($m_0$), curves F1 and F3 represent the functional curves of imaging resolutions corresponding to test patterns in field of views $m_1$ and $m_3$, which are left-right symmetrical with respect to the center thereof respectively, while curves F2 and F4 represent the functional curves of imaging resolutions corresponding to test patterns in field of views $m_2$ and $m_4$, which are up-down symmetrical with respect to the center thereof. As shown in FIG. 30, the person of ordinary skilled in the art should understand that when the focusing position of the central field view overlaps with the optical center of the image sensor 12 (the largest value of $F_0$), and the defocus distances of the four positions ($m_1$, $m_2$, $m_3$, $m_4$) are larger than 10 µm. That is to say, a tilt exists in the photographic arrangement 10, and thus a unilateral image blur shall occur, as shown in FIG. 31.

Figure 32:
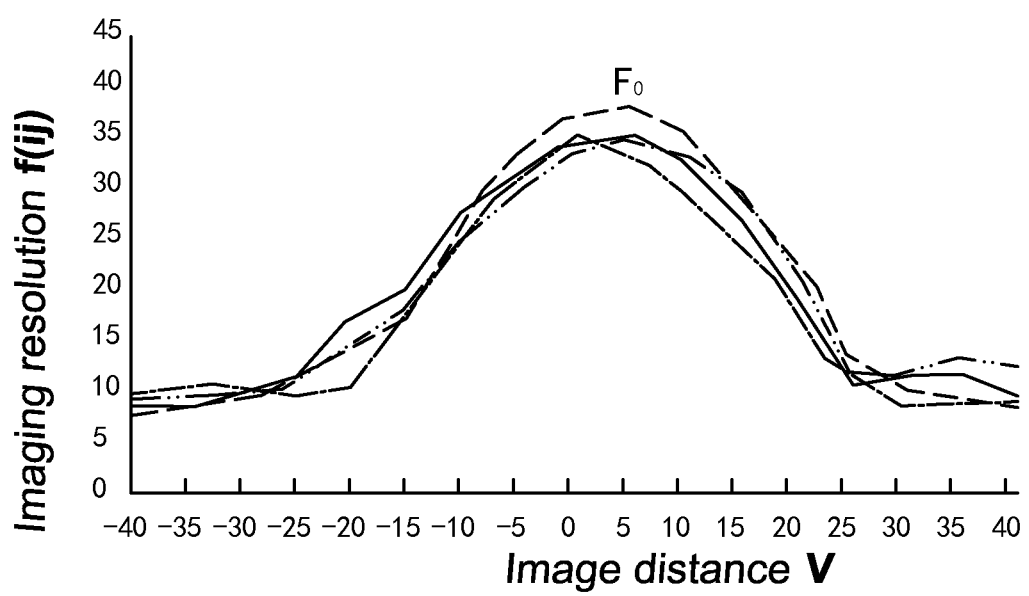
FIG. 32 is a diagram illustrating the relationship between the image resolution and image distance of test patterns at different positions after the adjusting process of the photographic arrangement of the present invention.
Figure 33:
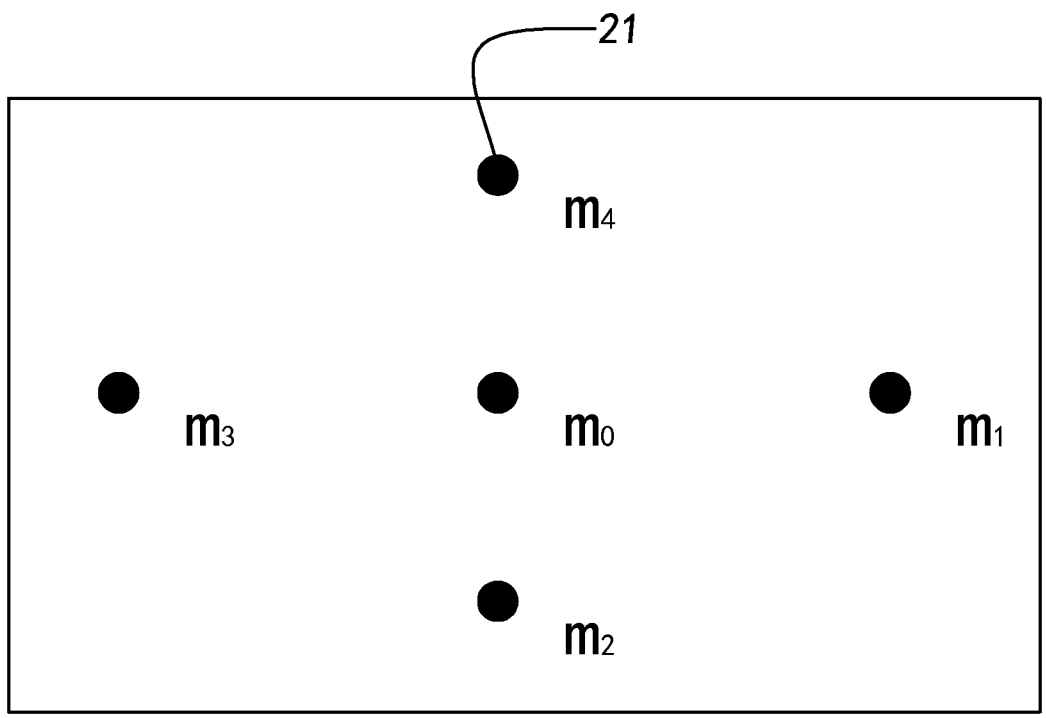
FIG. 33 is a diagram illustrating the images of the test patterns at different positions after the adjusting process of the photographic arrangement of the present invention.

During the above procedure, the testing method is able to use the functional equation regarding the imaging resolution and defocus amount to calculate out the tilt vector of the photographic arrangement 10, and then the adjusting unit 200 is employed to adjust the configuration of the photographic arrangement 10, and then obtain images shown in FIGS. 32 and 33, and the defocus distances of the four positions ($m_1$, $m_2$, $m_3$, $m_4$) are less than 3 µm, the tilt of the image plane is thus corrected, even images are provided corresponding to the four areas of $m_1$, $m_2$, $m_3$, and $m_4$, and the imaging resolution thereof is improved, indicating that the imaging quality of the photographic arrangement is greatly improved.

Figure 34:
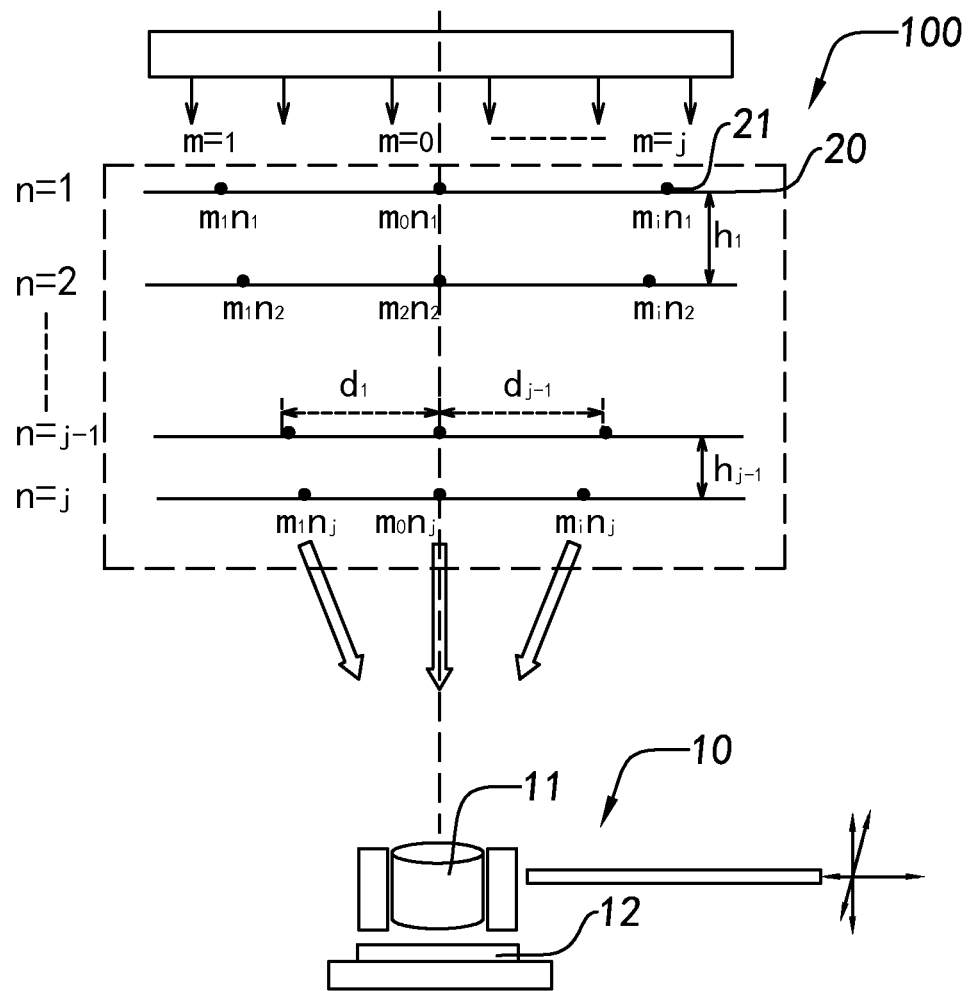
FIG. 34 is a schematic view illustrating the adjusting process of the photographic arrangement using the 3D test chart of the present invention.
Figure 35:
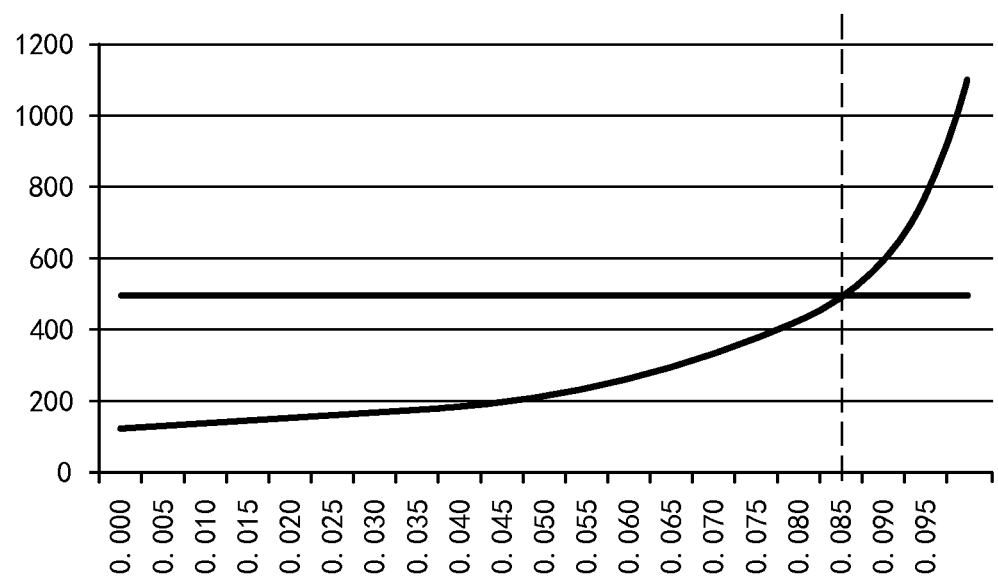
FIG. 35 is a diagram illustrating the relationship between the depth of field and the focal length of the photographic arrangement of the present invention.

Referring to FIG. 34, when employing the adjusting arrangement to test and adjust the photographic arrangement 10, the image sensor 12 may be provided at the adjusting platform of the adjusting unit 200, such as a six-axis adjusting device or other multi-axis adjusting device, and the photographic module 11 is then aligned with the image sensor 12 in such a manner that the photographic module 11 is provided between the 3D test chart 100 and the adjusting platform. Referring to FIG. 35, each test pattern 21 of the 3D test chart is designated with an image distance, when the photographic module 11 and the image sensor 12 are used to capture information of each test pattern 21 of the 3D test chart 100, an image containing information of different depths is obtained.

Referring to FIG. 28, when the tilt vector of the photographic arrangement 10 is obtained, the corresponding adjusting order is input to the adjusting unit 200 to adjust the configuration of the photographic module 11 and the image sensor 12 as well as the relative position therebetween, so as to improve the imaging quality of the photographic arrangement 10.

It is worth mentioning that the focusing position and the tilt vector of the photographic arrangement 10 can be obtained based on the same image and the same functional equation. When the adjusting order is input, the adjusting platform will simultaneously accomplish the adjusting process for correcting the focusing position and the tilt of the image plane of the photographic arrangement 10, so that the efficiency for testing and adjusting the photographic arrangement 10 is greatly improved.

Furthermore, after finishing the adjusting process of the photographic arrangement 10, it is required to evaluate the adjusting result to the photographic arrangement 10, so that the above steps are repeated to testing and calculating the imaging resolution. If the imaging resolution of the photographic arrangement 10 meets the requirements, then it is assumed that the adjusting process by the adjusting arrangement is effective, and then a solidifying process is carried out the fix up the photographic module 11 and the image sensor 12. If the imaging resolution of the photographic arrangement 10 does not meet the requirements, then it is assumed that the adjusting process by the adjusting arrangement is not enough, a subsequent adjusting process should be carried out. It is worth mentioning that according to an embodiment of the present invention, when excessive adjusting steps, for example three times, are carried out but the desired adjusting effect still cannot be achieved, then there may be serious problem in the photographic arrangement 10, so that no further adjusting steps need to be carried out.

Figure 39:
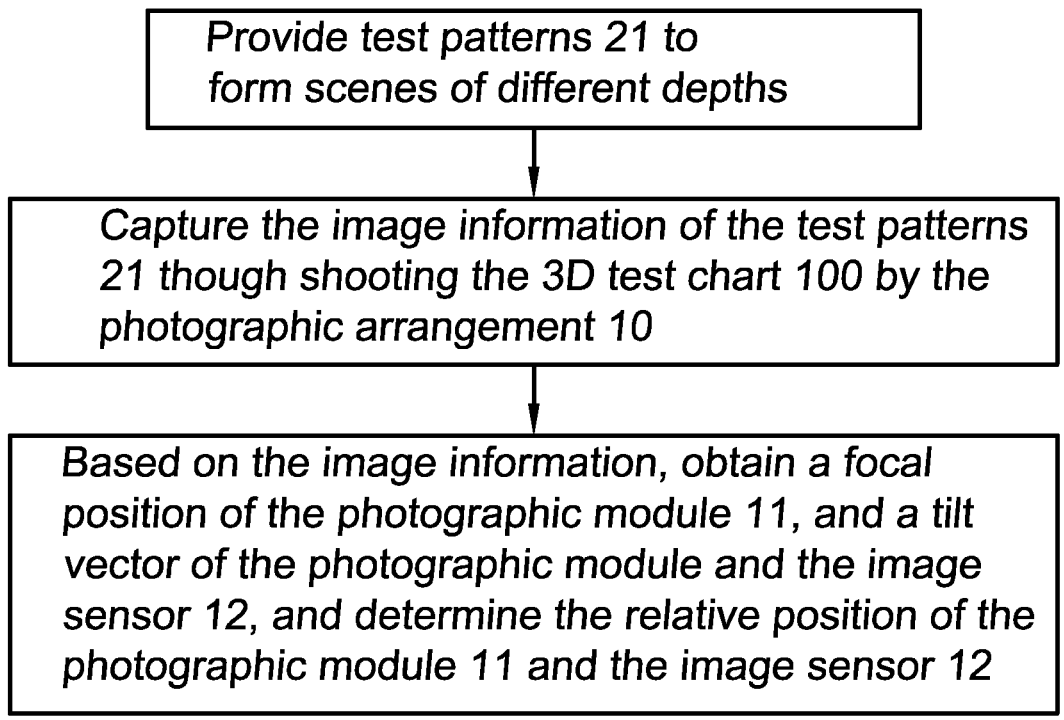
FIG. 39 is a flow chart illustrating the testing process of the present invention.

Accordingly, as shown in FIG. 39, the present invention provides a method for testing the photographic arrangement 10 which comprises a photographic module 11 and an image sensor 12, wherein the method comprises the following steps.

(a) Configure a plurality of test patterns 21 in a direction along a depth thereof to provide a plurality of scenes of different depths.

(b) Capture the image information of the plurality of test patterns 21 though shooting the 3D test chart 100 by the photographic arrangement 10.

(c) Based on the image information, obtain a focal position of the photographic module 11, and a tilt vector of the photographic module and the image sensor 12, and determine the relative position of the photographic module 11 and the image sensor 12.

Preferably, as shown in FIG. 31, in the step (a), the 3D test chart 100 is configured to comprise a plurality of test chart layers 20 each proved with at least one test pattern 21, wherein each test pattern 21 of one test chart layer 20 does not overlap with other test patterns 21 of other test chart layers 20 in the direction along the depth thereof.

Preferably, in the step (a), the method further comprises the steps of: (a.1) collecting the parameters of the photographic arrangement 10 to determine the position configuration of the 3D test chart 100; and (a.2) Determining a quantity of the test chart layers, configuring a layout of the test patterns of the test chart layers based on precision requirements of the photographic arrangement 10. In addition, the method may still comprise a step of (a.3): determining a size of each test pattern.

Accordingly, as shown in FIG. 40, the present invention further provides a method for adjusting the photographic arrangement 10, wherein the method comprises the following steps.

(α) Capture information of scenes of different depths of a 3D test chart, determine a relative position of a photographic module 11 and an image sensor 12 of the photographic arrangement 10, and obtain related data corresponding to the relative position.

(β) Based on the related data, accomplish an adjusting process of the photographic module 11 and the image sensor 12.

Preferably, the method may comprise the step of obtaining an image containing the information of scenes of different depths through shooting the test patterns 21 of the 3D test chart 100, wherein the plurality of test patterns 21 of the 3D test chart 100 do not overlap with each other, and two adjacent test patterns in the direction along the depth are spacedly arranged with each other.

One skilled in the art will understand that the embodiment of the present invention as shown in the drawings and described above is exemplary only and not intended to be limiting.

It will thus be seen that the objects of the present invention have been fully and effectively accomplished. The embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A 3D test chart arrangement, comprising:
a plurality of test chart layers arranged in a direction along a depth thereof, wherein each of said test chart layers is provided with at least one test pattern, wherein in the direction along the depth, each of said test pattern of one of said test chart layers does not overlap with other said test patterns of other said test chart layers, wherein set a as a parameter which represents a precision requirement for fitting a back focus of a photographic arrangement to be tested, set EFL as a parameter which represents a focal length, set h as a parameter which represent a position configuration of said 3D test chart, wherein h.sub.j represents a position of jth layer of said test chart layers, wherein a functional equation regarding a position configuration of said test chart layers is as follows: a=−((EFL*(−hj)/(EFL−hj)−(EFL*(−h)/(EFL−h))); and
a plurality of carriers which are overlappedly and spacedly aligned with each other, wherein said plurality of test chart layers are formed on said plurality of carriers respectively, wherein a distance between two of said plurality of carriers determines a distance between two of said plurality of test chart layers on said two of said plurality of carriers.

2. The 3D test chart arrangement, as recited in claim 1, wherein set n as a parameter which represents a quantity of said test chart layers, set t as a parameter which represents an error tolerance of said photographic arrangement, set s as a parameter which represents a quantity of moving steps of said photographic arrangement, and then a functional equation regarding said quantity of said test pattern payers is as follows: n=f(t, a, s).

3. The 3D test chart arrangement, as recited in claim 2, wherein set d as a parameter which represents a layout of said test patterns, wherein d.sub.ij is a parameter which represents a distance from one of said test pattern of said corresponding test chart layer to a center of said test chart layer, set F as a parameter which represents a testing field of view of said photographic arrangement, wherein a functional equation regarding said layout of said test patterns is as follows: d.sub.ij=f'(F, h.sub.ij, EFL).

4. The 3D test chart arrangement, as recited in claim 3, wherein set L as a parameter which represents a size of each cross type test pattern and L.sub.ij is a parameter representing a size of ith test pattern of jth test chart layer, set t' as a parameter which represents an error tolerance for manufacturing said 3D test chart, set n' as the parameter which represents an index of refraction of said 3D test chart, set s' as a parameter which represents an allowable disc of confusion during a calculating step of a software, set .DELTA.F as a parameter which represents an allowable range of a span of testing field of view, and a functional equation regarding said size of said test pattern is as follows: L.sub.ij= f(dij, .DELTA.F, t', n', s').

5. A method of designing a 3D test chart, comprising the following steps:
(A) collecting a plurality of parameters of a photographic arrangement to be tested, and determining a position configuration of said 3D test chart; and
(B) based on a precision requirement of said photographic arrangement, determining a quantity of test chart layers, and configuring a layout of test patterns of said test chart layers and determining a size of each of said test patterns;
wherein the step (A) further comprising the steps of
setting a as a parameter which represents a precision requirement for fitting a back focus of said photographic arrangement to be tested, setting EFL as a parameter which represents a focal length,
setting h as a parameter which represent a position configuration of said 3D test chart, wherein h.sub.j represents a position of jth layer of said test chart layers, and
obtaining a functional equation regarding a position configuration of said test chart layers as follows: a=−((EFL*(−hj)/(EFL−hj)−(EFL*(−h)/(EFL−h))).

6. The method, as recited in claim 5, wherein the step (A) further comprising the steps of setting n as a parameter which represents a quantity of said test chart layers, setting t as a parameter which represents an error tolerance of said photographic arrangement, setting s as a parameter which represents a quantity of moving steps of said photographic arrangement, and obtaining a functional equation regarding said quantity of said test pattern payers as follows: n=f(t, a, s), wherein the step (A) further comprising the steps of setting d as a parameter which represents a layout of said test patterns, wherein d.sub.ij is a parameter which represents a distance from one of said test pattern of said corresponding test chart layer to a center of said test chart layer, setting F as a parameter which represents a testing field of view of said photographic arrangement, and obtaining a functional equation regarding said layout of said test patterns as follows: d.sub.ij=f(F, h.sub.ij, EFL).

7. The method, as recited in claim 6, further comprising the steps of setting L as a parameter which represents a size of each test pattern and L.sub.ij is a parameter representing a size of ith test pattern of jth test chart layer, setting t' as a parameter which represents an error tolerance for manufacturing said 3D test chart, setting n' as the parameter which represents an index of refraction of said 3D test chart, setting s' as a parameter which represents an allowable disc of confusion during a calculating step of a software, setting .DELTA.F as a parameter which represents an allowable range of a span of testing field of view, and obtaining a functional equation regarding said size of said test pattern as follows:
L.sub.ij=f(dij, .DELTA.F, t', n', s').

8. The method, as recited in claim 7, wherein a shape of said test pattern is selected from the group consisting of a square shape, a triangular shape, a circular shape, an oval shape, a cross shape, a shape of a pair of black and white lines, a star shape and the combination thereof.

* * * * *